United States Patent
Herle

(10) Patent No.: US 11,508,988 B2
(45) Date of Patent: Nov. 22, 2022

(54) LITHIUM ANODE DEVICE STACK MANUFACTURING

(71) Applicant: Applied Materials, Inc., Santa Clara, CA (US)

(72) Inventor: Subramanya P. Herle, Mountain View, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 9 days.

(21) Appl. No.: 16/129,002

(22) Filed: Sep. 12, 2018

(65) Prior Publication Data

US 2019/0088987 A1    Mar. 21, 2019

Related U.S. Application Data

(60) Provisional application No. 62/561,442, filed on Sep. 21, 2017.

(51) Int. Cl.
*H01M 10/0525* (2010.01)
*H01M 4/66* (2006.01)
(Continued)

(52) U.S. Cl.
CPC ....... *H01M 10/0525* (2013.01); *H01M 4/134* (2013.01); *H01M 4/661* (2013.01);
(Continued)

(58) Field of Classification Search
CPC ......... H01M 10/0525; H01M 10/0431; H01M 10/052; H01M 10/0562; H01M 4/661; H01M 4/662; H01M 4/667; H01M 4/134
See application file for complete search history.

(56) References Cited

U.S. PATENT DOCUMENTS

| | | | |
|---|---|---|---|
| 5,415,954 A | 5/1995 | Gauthier et al. | |
| 6,733,924 B1 | 5/2004 | Skotheim et al. | |

(Continued)

FOREIGN PATENT DOCUMENTS

| | | |
|---|---|---|
| CN | 107154499 | 9/2017 |
| EP | 1236231 A1 | 9/2002 |

(Continued)

OTHER PUBLICATIONS

Heng Zhang, et al, Single Lithium-Ion Conducting Solid Polymer Electrolytes: Advances and Perspectives.

(Continued)

*Primary Examiner* — Bethany L Martin
(74) *Attorney, Agent, or Firm* — Patterson + Sheridan, LLP

(57) ABSTRACT

Metal electrodes, more specifically lithium-containing anodes, high performance electrochemical devices, such as secondary batteries, including the aforementioned lithium-containing electrodes, and methods for fabricating the same are provided. In one implementation, an anode electrode structure is provided. The anode electrode structure comprises a current collector comprising copper, a lithium metal film formed on the current collector, a copper film formed on the lithium metal film, and a protective film formed on the copper film. The protective film is a lithium-ion conducting film selected from the group comprising lithium-ion conducting ceramic, a lithium-ion conducting glass, or ion conducting liquid crystal.

19 Claims, 10 Drawing Sheets

(51) Int. Cl.
  *H01M 4/134* (2010.01)
  *H01M 10/052* (2010.01)
  *H01M 10/0562* (2010.01)
  *H01M 10/04* (2006.01)

(52) U.S. Cl.
  CPC ........... *H01M 4/662* (2013.01); *H01M 4/667* (2013.01); *H01M 10/052* (2013.01); *H01M 10/0562* (2013.01); *H01M 10/0431* (2013.01)

(56) References Cited

U.S. PATENT DOCUMENTS

| | | |
|---|---|---|
| 6,797,428 B1 | 9/2004 | Skotheim et al. |
| 7,247,408 B2 | 7/2007 | Skotheim et al. |
| 7,745,048 B2 | 6/2010 | Hwang et al. |
| 2002/0012846 A1 | 1/2002 | Skotheim et al. |
| 2004/0072066 A1 | 4/2004 | Cho et al. |
| 2005/0008935 A1* | 1/2005 | Skotheim ............ H01M 4/666 429/218.1 |
| 2009/0191460 A1* | 7/2009 | Fujiwara ............ H01M 4/0419 429/209 |
| 2009/0297935 A1 | 12/2009 | Visco et al. |
| 2010/0104948 A1 | 4/2010 | Skotheim et al. |
| 2011/0318553 A1 | 12/2011 | Lotz |
| 2014/0127569 A1 | 5/2014 | Maeda et al. |
| 2015/0318555 A1* | 11/2015 | Oku ..................... B32B 27/283 429/245 |
| 2017/0069894 A1* | 3/2017 | Ishihara ............ H01M 4/0404 |
| 2019/0074509 A1* | 3/2019 | Hirai .................... H01G 11/86 |
| 2020/0274124 A1* | 8/2020 | Thielen ............... H01M 10/052 |

FOREIGN PATENT DOCUMENTS

| | | |
|---|---|---|
| JP | 2004-527888 A | 9/2004 |
| JP | 2005-129535 A | 5/2005 |
| KR | 20050038905 A | 4/2005 |
| KR | 20080105853 A | 12/2008 |
| KR | 20120032044 A | 4/2012 |
| KR | 20150020022 A | 2/2015 |
| WO | 01-39303 A1 | 5/2001 |
| WO | 02095849 A | 11/2002 |
| WO | 2015/003123 A1 | 1/2015 |
| WO | 2016/112333 A1 | 7/2016 |
| WO | 2017-131997 A1 | 8/2017 |

OTHER PUBLICATIONS

International Search Report and Written Opinion for International Application No. PCT/US2018/050625 dated Feb. 28, 2019.
Korean Office Action dated Oct. 8, 2021 for Application No. 10-2020-7011471.
Office Action for Japanese Application No. 2020-515943 dated Jun. 22, 2021.
European Search Report for European Application No. 18859927 dated May 6, 2021.
Korean Office Action dated Apr. 22, 2022 for Application No. 10-2020-7011471.
Japanese Office Action dated Feb. 22, 2022 for Application No. 2020-515943.

* cited by examiner

LITHIUM ANODE DEVICE STACK MANUFACTURING

CROSS-REFERENCE TO RELATED APPLICATIONS

This application claims benefit of U.S. Provisional Patent Application Ser. No. 62/561,442, filed Sep. 21, 2017, which is incorporated herein by reference in its entirety.

BACKGROUND

Field

Implementations described herein generally relate to metal electrodes, more specifically lithium-containing anodes, high performance electrochemical devices, such as secondary batteries, including the aforementioned lithium-containing electrodes, and methods for fabricating the same.

Description of the Related Art

Rechargeable electrochemical storage systems are currently becoming increasingly valuable for many fields of everyday life. High-capacity electrochemical energy storage devices, such as lithium-ion (Li-ion) batteries, are used in a growing number of applications, including portable electronics, medical, transportation, grid-connected large energy storage, renewable energy storage, and uninterruptible power supply (UPS). Traditional lead/sulfuric acid batteries often lack the capacitance and are often inadequately cycleable for these growing applications. Lithium-ion batteries, however, are thought to have the best chance.

Typically, lithium-ion batteries do not contain any metallic lithium for safety reasons but instead use a graphitic material as the anode. However, the use of graphite, which, in the charged state can be charged up to the limit composition $LiC_6$, results in a much lower capacity, in comparison with the use of metallic lithium. Currently, the industry is moving away from graphitic-based anodes to silicon-blended graphite to increase energy cell density. However, silicon blended graphite anodes suffer from first cycle capacity loss. Thus, there is a need for lithium metal deposition to replenish first cycle capacity loss of silicon blended graphite anodes. However, lithium metal faces several device integration challenges.

Lithium is an alkali metal. Like the heavy element homologs of the first main group, lithium is characterized by a strong reactivity with a variety of substances. Lithium reacts violently with water, alcohols and other substances that contain protic hydrogen, often resulting in ignition. Lithium is unstable in air and reacts with oxygen, nitrogen and carbon dioxide. Lithium is normally handled under an inert gas atmosphere (noble gases such as argon) and the strong reactivity of lithium necessitates that other processing operations also be performed in an inert gas atmosphere. As a result, lithium provides several challenges when it comes to processing, storage, and transportation.

Protective surface treatments have been developed for lithium metal. One method of protective surface treatment of lithium metal includes coating the lithium metal with a wax layer, for example, polyethylene wax. However, a large amount of coating agent is typically applied which interferes with subsequent processing of the lithium metal film.

Another method of protective surface treatment proposes producing stabilized lithium metal powder ("SLMP") with a continuous carbonate coating, polymer coating, for example, polyurethanes, PTFE, PVC, polystyrene and others. However, these polymer coatings can cause problems when prelithiating electrode materials.

Therefore, there is a need for methods and systems for the deposition and processing of lithium metals in energy storage systems.

SUMMARY

Implementations described herein generally relate to metal electrodes, more specifically lithium-containing anodes, high performance electrochemical devices, such as secondary batteries, including the aforementioned lithium-containing electrodes, and methods for fabricating the same. In one implementation, an anode electrode structure is provided. The anode electrode structure comprises a current collector comprising copper, a lithium metal film formed on the current collector, a copper film formed on the lithium metal film, and a protective film formed on the copper film. The protective film is a lithium-ion conducting film selected from the group comprising lithium-ion conducting ceramic, lithium-ion conducting glass, or ion conducting liquid crystal.

In another implementation, an anode electrode structure is provided. The anode electrode structure comprises a current collector comprising copper, a silicon graphite anode formed on the current collector, a film of lithium metal formed on the silicon graphite anode, and a protective film formed on the film of lithium metal. The protective film is a lithium-ion conducting material selected from the group comprising lithium-ion conducting ceramic, lithium-ion conducting glass, ion conducting polymer, ion conducting liquid crystal, composite combinations thereof, or unit layer combinations thereof.

In yet another implementation, an anode electrode structure is provided. The anode electrode structure comprises a current collector comprising copper, a lithium metal film formed on the current collector and a protective film stack formed on the lithium metal film. The protective film stack comprises a protective film formed on the lithium metal film, a first polymer film formed on the protective film, a ceramic film formed on the first polymer film and a second polymer film formed on the ceramic film. The protective film is selected from the group of lithium fluoride (LiF), aluminum oxide, bismuth chalcogenide, copper chalcogenide, lithium carbonate ($Li_2CO_3$), and combinations thereof.

In yet another implementation, an anode electrode structure is provided. The anode electrode structure comprises a current collector comprising copper, a lithium metal film formed on the current collector and a protective film stack formed on the lithium metal film. The protective film stack comprises a first polymer film formed on the lithium metal film, a dielectric film formed on the first polymer film and a second polymer film formed on the ceramic film.

In yet another implementation, an anode electrode structure is provided. The anode electrode structure comprises a current collector comprising copper, a lithium metal film formed on the current collector and a protective film stack formed on the lithium metal film. The protective film stack comprises a copper film formed on the lithium metal film, a dielectric film formed on the copper film, and a polymer film formed on the dielectric film.

In yet another implementation, a method is provided. The method comprises forming a lithium metal film on a current collector. The current collector comprises copper. The method further comprises forming a copper film on the lithium metal film and forming a protective film formed on the copper film. The protective film is a lithium-ion conducting film selected from the group comprising lithium-ion conducting ceramic, lithium-ion conducting glass, ion conducting polymer, ion conducting liquid crystal, composite combinations thereof, or unit layer combinations thereof.

In yet another implementation, a method is provided. The method comprises forming a silicon graphite film on a current collector. The current collector comprises copper. The method further comprises forming a film of lithium metal on the silicon graphite anode and forming a protective film on the film of lithium metal. The protective film is a lithium-ion conducting material selected from the group comprising lithium-ion conducting ceramic, lithium-ion conducting glass, ion conducting polymer, ion conducting liquid crystal, composite combinations thereof, or unit layer combinations thereof.

In yet another implementation, a method is provided. The method comprises forming a lithium metal film on a current collector. The current collector comprises copper. The method further comprises forming a protective film stack on the lithium metal film. The protective film stack comprises forming a protective film on the lithium metal film, forming a first polymer film formed on the protective film, forming a ceramic film formed on the first polymer film, and forming a second polymer film on the ceramic film. The protective film is selected from the group of lithium fluoride (LiF), aluminum oxide, bismuth chalcogenide, copper chalcogenide, lithium carbonate ($Li_2CO_3$), and combinations thereof.

In yet another implementation, a method is provided. The method comprises forming a lithium metal film on a current collector. The current collector comprises copper. The method further comprises forming a protective film stack on the lithium metal film. The protective film stack comprises forming a first polymer film on the lithium metal film, forming a dielectric film on the first polymer film, and forming a second polymer film on the dielectric film.

In yet another implementation, a method is provided. The method comprises forming a lithium metal film on a current collector. The current collector comprises copper. The method further comprises forming a protective film stack on the lithium metal film. The protective film stack comprises forming a metal film on the lithium metal film, forming a dielectric film on the first polymer film, and forming a polymer film on the dielectric film.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1:
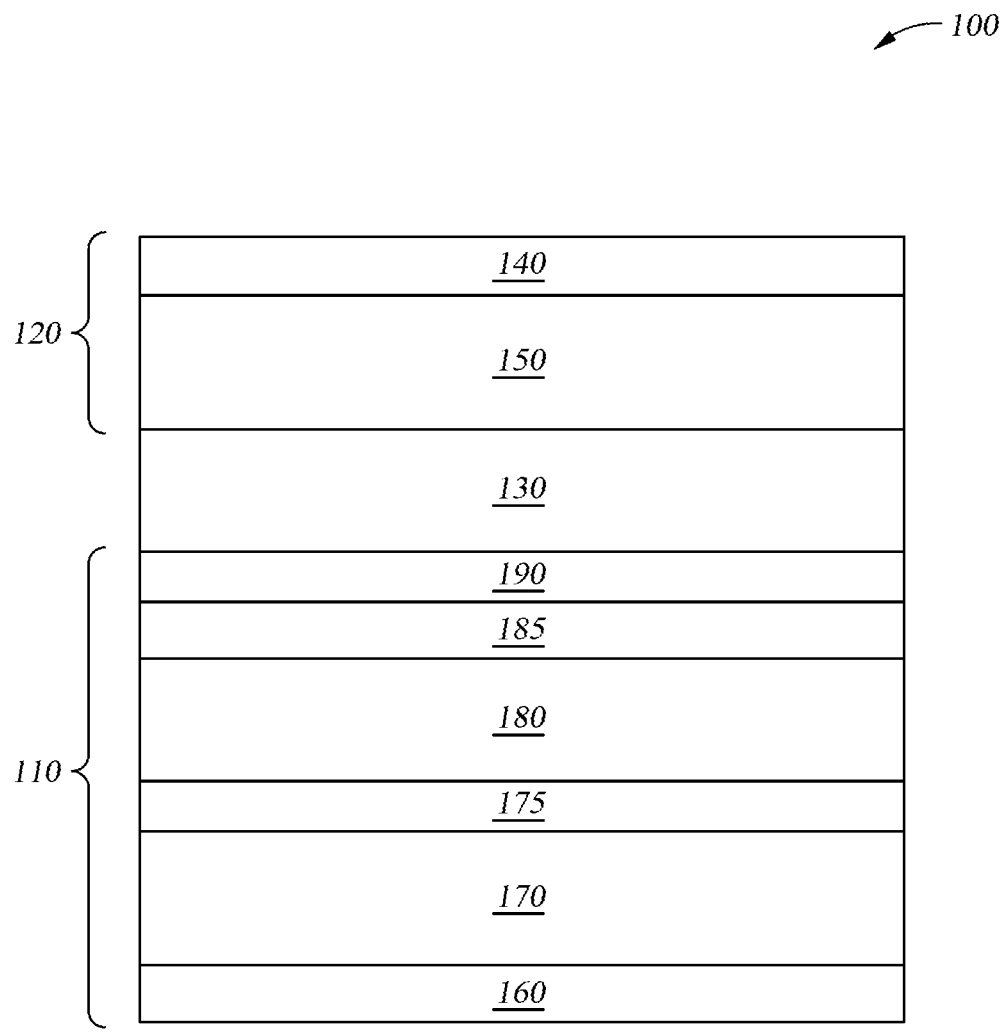
FIG. 1 illustrates a schematic cross-sectional view of one implementation of an energy storage device incorporating an electrode structure formed according to implementations described herein.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes anode electrodes, high performance electrochemical cells and batteries including the aforementioned anode electrodes, and methods for fabricating the same. Certain details are set forth in the following description and in FIGS. 1-12 to provide a thorough understanding of various implementations of the disclosure. Other details describing well-known structures and systems often associated with electrochemical cells and batteries are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a reel-to-reel coating system, such as TopMet™, SMARTWEB®, TopBeam™ all of which are available from Applied Materials, Inc. of Santa Clara, Calif. Other tools capable of performing physical vapor deposition processes (e.g., high rate evaporation processes and magnetron sputtering processes) may also be adapted to benefit from the implementations described herein. In addition, any system enabling the physical vapor deposition processes described herein can be used to advantage. The apparatus description described herein is illustrative and should not be construed or interpreted as limiting the scope of the implementations described herein. It should be understood that although described as a reel-to-reel process, the implementations described herein may also be performed on discrete substrates.

Energy storage devices, for example, batteries, typically consist of a positive electrode, an anode electrode separated by a porous separator, and an electrolyte, which is used as an ion-conductive matrix. Graphite anodes are the current state of the art but the industry is moving from the graphite based anode to silicon blended graphite anodes to increase cell energy density. However, silicon blended graphite anodes often suffer from irreversible capacity loss that occurs during the first cycle. Thus, there is a need for methods for replenishing this first cycle capacity loss.

Deposition of lithium metal is one such method for replenishing this first cycle capacity loss of silicon blended graphite anode. While there are numerous methods for lithium metal deposition (e.g., thermal evaporation, lamination, printing, etc.), handling of lithium metal deposited on a spool before device stacking needs to be addressed, especially in a high-volume manufacturing environment. In one implementation, methods and systems for forming lithium anode devices are provided.

Using the implementations described herein, the deposited lithium metal, either single-sided or dual-sided, can be protected during winding and unwinding of the reels downstream. Deposition of thin films of Li-ion conducting polymers, ion conducting ceramics, or ion conducting glass has several advantages. First, reels of electrodes containing lithium metal can be wound and unwound without lithium metal touching adjacent electrodes. Second, a stable solid electrolyte interface (SEI) is established for better cell performance and high electrochemical utilization of lithium metal. The protective layer can also help to suppress or eliminate lithium dendrite, especially at high current density operation. In addition, the use of protective films reduces the complexity of manufacturing systems and is compatible with current manufacturing systems.

FIG. 1 illustrates a schematic cross-sectional view of one implementation of an energy storage device 100 incorporating an anode electrode structure formed according to implementations described herein. The energy storage device 100, even though shown as a planar structure, may also be formed into a cylinder by rolling the stack of layers; furthermore, other cell configurations (e.g., prismatic cells, button cells, or stacked electrode cells) may be formed. The energy storage device 100 includes an anode electrode structure 110 and a cathode electrode structure 120 with a separator film 130 positioned therebetween. The cathode electrode structure 120 includes a cathode current collector 140 and a cathode film 150. The anode electrode structure 110 includes an anode current collector 160, an anode film 170, and at least one of a protective film 175, a lithium-ion conducting polymer film 180, a ceramic coating 185, and a bonding porous polymer film 190.

The cathode electrode structure 120 includes the cathode current collector 140 with the cathode film 150 formed on the cathode current collector 140. It should be understood that the cathode electrode structure 120 may include other elements or films.

The current collectors 140, 160, on the cathode film 150 and the anode film 170, respectively, can be identical or different electronic conductors. Examples of metals that the current collectors 140, 160 may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, at least one of the current collectors 140, 160 is perforated. In one implementation, at least one of the current collectors 140, 160 includes a polyethylene terephthalate ("PET") polymer substrate coated with a metallic material. In one implementation, the anode current collector 160 is a PET film coated with copper. In another implementation, the anode current collector 160 is a multi-metal layer on PET. The multi-metal layer can be combinations of copper, chromium, nickel, etc. In one implementation, the anode current collector 160 is a multi-layer structure that includes a copper-nickel cladding material. In one implementation, the multi-layer structure includes a first layer of nickel or chromium, a second layer of copper formed on the first layer, and a third layer including nickel, chromium, or both formed on the second layer. In one implementation, the anode current collector 160 is nickel coated copper. Furthermore, current collectors may be of any form factor (e.g., metallic foil, sheet, or plate), shape and micro/macro structure. Generally, in prismatic cells, tabs are formed of the same material as the current collector and may be formed during fabrication of the stack, or added later. In some implementations, the current collectors extend beyond the stack and the portions of the current collector extending beyond the stack may be used as tabs. All components except current collectors 140 and 160 contain lithium ion electrolytes. In one implementation, the cathode current collector 140 is aluminum. In another implementation, the cathode current collector 140 comprises aluminum deposited on a PET film. In one implementation, the cathode current collector 140 has a thickness from about 0.5 µm to about 20 µm (e.g., from about 1 µm to about 10 µm; from about 2 µm to about 8 µm; or from about 5 µm to about 10 µm). In one implementation, the anode current collector 160 is copper. In one implementation, the anode current collector 160 has a thickness from about 0.5 µm to about 20 µm (e.g., from about 1 µm to about 10 µm; from about 2 µm to about 8 µm; from about 6 µm to about 12 µm; or from about 5 µm to about 10 µm).

The cathode film 150 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $BiF_3$, $Fe_2OF_4$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiophene. The cathode film 150 or cathode may be made from a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

The anode electrode structure 110 includes the anode current collector 160 with the anode film 170 formed on the anode current collector 160. The anode electrode structure 110 may optionally include at least one of the protective film 175, the lithium-ion conducting polymer film 180, the ceramic coating 185, and a bonding porous polymer film 190. In the implementation depicted in FIG. 1, the protective film 175 is formed on the anode film 170. The film of the lithium-ion conducting polymer film 180 is formed on the protective film 175. The ceramic coating 185 is formed on the lithium-ion conducting polymer film 180. A bonding porous polymer film 190 is formed between the separator film 130 and the anode film 170.

The anode film 170 may be any material compatible with the cathode film 150. The anode film 170 may have an energy capacity greater than or equal to 372 mAh/g, preferably 700 mAh/g, and most preferably 1000 mAh/g. The anode film 170 may be constructed from graphite, silicon-containing graphite, lithium metal, lithium metal foil or a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or combinations thereof. The anode film 170 typically comprises intercalation compounds containing lithium or insertion compounds containing lithium. In some implementations, wherein the anode film 170 comprises lithium metal, the lithium metal may be deposited using the methods described herein.

In one implementation, the anode film 170 has a thickness from about 10 μm to about 200 μm (e.g., from about 1 μm to about 100 μm; from about 10 μm to about 30 μm; from about 20 μm to about 30 μm; from about 1 μm to about 20 μm; or from about 50 μm to about 100 μm). In one implementation, the anode film 170 is a lithium metal film.

In some implementations, the protective film 175 is formed on the anode film 170. The protective film 175 includes at least one of lithium fluoride (LiF), a metal film (e.g., copper, bismuth, tin, or combinations thereof), a copper chalcogenide (e.g., CuS, $Cu_2Se$, $Cu_2S$), a bismuth chalcogenide (e.g., $Bi_2Te_3$, $Bi_2Se_3$), and lithium carbonate ($Li_2CO_3$). In some implementations, the protective film 175 is permeable to at least one of lithium ions and lithium atoms. The protective film 175 provides surface protection of the anode film 170, which allows for handling of the anode film in a dry room. Not to be bound by theory but it is believed that the protective film 175 can take-up Li-conducting electrolyte to form gel during device fabrication which is beneficial for forming good solid electrolyte interface (SEI) and also helps lower resistance. In some implementations where the energy storage device 100 is a solid-state energy storage device, the protective film 175 helps to build a better SEI and improve device performance. The protective film 175 can be directly deposited on the anode film 170 by Physical Vapor Deposition (PVD), such as evaporation or sputtering, atomic layer deposition (ALD), a slot-die process, dip coating, a thin-film transfer process, gravure coating or a three-dimensional lithium printing process. PVD is a preferred method for deposition of the protective film 175.

In some implementations, the protective film 175 is a metal film. The metal film may be an ultra-thin metal seed film. The metal film may be a copper film. The copper film may be an ultra-thin copper film.

The protective film 175 may be a coating or a discrete film, either having a thickness in the range of 1 nanometer to 2,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). The protective film 175 may be a discrete film having a thickness in the range of 1 micron to 50 microns (e.g., in the range of 1 micron to 25 microns).

The protective film 175 may be porous. In some implementations, the protective film 175 has nanopores. In one implementation, the protective film 175 has a plurality of nanopores that are sized to have an average pore size or diameter less than about 10 nanometers (e.g., from about 1 nanometer to about 10 nanometers; from about 3 nanometers to about 5 nanometers). In another implementation, the protective film 175 has a plurality of nanopores sized to have an average pore size or diameter less than about 5 nanometers. In one implementation, the protective film 175 has a plurality of nanopores having a diameter ranging from about 1 nanometer to about 20 nanometers (e.g., from about 2 nanometers to about 15 nanometers; or from about 5 nanometers to about 10 nanometers).

In some implementations, a lithium-ion conducting polymer film 180 is formed on the protective film 175. Not to be bound by theory, but it is believed that the lithium-ion conducting polymer film 180 conducts lithium ions as well as blocking any dendrites that may from the anode film 170. Examples of ion-conducting polymers that may be used to form the lithium-ion conducting polymer film 180 include, but are not limited to, polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, poly (sulfur-random)-triallylamine, polyether ether ketone (PEEK), carboxymethyl cellulose (CMC), styrene butadiene rubber (SBR) ionic liquids and combinations thereof.

In some implementations, the ceramic coating 185 is formed on the lithium-ion conducting polymer film 180. The ceramic coating 185 comprises one or more dielectric materials. The dielectric material may be a ceramic material. The ceramic material may be an oxide. The ceramic material may be selected from, for example, aluminum oxide ($Al_2O_3$), $AlO_x$, $AlO_xN_y$, aluminum oxyhydroxide AlO(OH), AlN (aluminum deposited in a nitrogen environment), calcium carbonate ($CaCO_3$), titanium dioxide ($TiO_2$), niobium oxide ($Nb_2O_5$), $SiS_2$, $SiPO_4$, silicon oxide ($SiO_2$), zirconium oxide ($ZrO_2$), MgO, $TiO_2$, $Ta_2O_5$, $Nb_2O_5$, $LiAlO_2$, $LiNbO_3$, $LiTaO_3$, $Li_2NbO_3$, $BaTiO_3$, BN, ion-conducting garnet, ion-conducting perovskite, ion-conducting anti-perovskites, porous glass ceramic, and the like, or combinations thereof. In one implementation, the ceramic material is a material selected from the group consisting of: porous aluminum oxide, porous-$ZrO_2$, porous-$SiO_2$, porous-MgO, porous-$TiO_2$, porous-$Ta_2O_5$, porous-$Nb_2O_5$, porous-$LiAlO_2$, porous-$LiNbO_3$, porous-$LiTaO_3$, porous-$Li_2NbO_3$, porous-$BaTiO_3$, ion-conducting garnet, anti-ion-conducting perovskites, $Li_2S$—$P_2S_5$ glass, porous glass dielectric, or combinations thereof. The ceramic coating 185 is a binder-free dielectric film. In some implementations, the ceramic coating 185 is a porous aluminum oxide film.

The ceramic coating 185 may be a lithium-ion conducting ceramic or a lithium-ion conducting glass. The Li-ion conducting material may be comprised of one or more of LiPON, doped variants of either crystalline or amorphous phases of $Li_7La_3Zr_2O_{12}$, doped anti-perovskite compositions, $Li_2S$—$P_2S_5$, $Li_2S$, $LiKSO_4$, $Li_3P$, $Li_5B_7S_{13}$, $Li_{10}GeP_2S_{12}$, $Li_3PS_4$, $LiNH_2$, $LiNO_3$, lithium amide borohydride $Li(BH_4)_{1-x}(NH_2)_x$, lithium phosphate glasses, $(1-x)LiI$-$(x)Li_4SnS_4$, $xLiI$-$(1-x)Li_4SnS_4$, mixed sulfide and oxide electrolytes (crystalline LLZO, amorphous $(1-x)LiI$-$(x)Li_4SnS_4$ mixture, and amorphous $xLiI$-$(1-x)Li_4SnS_4$) for example. In one implementation, x is between 0 and 1 (e.g., 0.1, 0.2, 0.3, 0.4, 0.5, 0.6, 0.7, 0.8, and 0.9). The Li-ion conducting material can be directly deposited on the lithium metal film using either a by Physical Vapor Deposition (PVD), Chemical Vapor Deposition (CVD), spray, doctor blade, printing or any of a number of coating methods. A suitable method for some implementations is PVD. In some implementations, the ceramic coating 185 does not need to be ion conducting, however, once filled with electrolyte (liquid, gel, solid, combination etc.), the combination of porous substrate and electrolyte is ion conducting.

In some implementations, the ceramic coating 185 is selected from the group consisting of: lithium zirconate ($Li_2ZrO_3$), LiPON, crystalline or amorphous phases of garnet-type $Li_7La_3Zr_2O_{12}$, LISICON (e.g., $Li_{2+2}Zn_{1-x}GeO_4$ wherein 0<x<1), NASICON (e.g., $Na_{1+x}Zr_2Si_xP_{3-x}O_{12}$ wherein 0<x<3), lithium borohydride ($LiBH_4$), doped antiperovskite compositions, lithium containing sulfides (e.g., $Li_2S$, $Li_2S$—$P_2S_5$, $Li_{10}GeP_2S_{12}$ and $Li_3PS_4$), and lithium argyrodites (e.g., $LiPS_5X$ wherein x is Cl, Br or I).

The ceramic coating 185 may have a thickness in the range of 1 nanometer to 2,000 nanometers (e.g., in the range of 10 nanometers to 600 nanometers; in the range of 50 nanometers to 100 nanometers; in the range of 100 nanometers to 200 nanometers; in the range of 100 nanometers to 150 nanometers).

In some implementations, the bonding porous polymer film 190 is formed between the ceramic coating 185 and the separator film 130. Not to be bound by theory, but it is believed that the bonding porous polymer film 190 helps improve adhesion between the anode electrode structure 110 and the separator film 130 when joined together.

The polymer for the bonding porous polymer film 190 can be chosen from polymers currently used in the Li-ion battery industry. Examples of polymers that may be used to form the gel polymer film include, but are not limited to, polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. Not to be bound by theory but it is believed that the bonding porous polymer film 190 can take-up Li-conducting electrolyte to form gel during device fabrication which is beneficial for forming good solid electrolyte interface (SEI) and also helps lower resistance. In some implementations, gel electrolyte or liquid crystal electrolyte is made by using mixture of warm liquids and lithium ion conducting salt. The mixture of warm liquids is injected into the spiral-wound electrodes or stacked electrodes filling the network electrode pores and the electrolyte forms a solid or gel at room temperature. The bonding porous polymer film 190 can be formed by dip coating, slot-die coating, gravure coating, or printing. Organic polymers with sulfur ions (e.g., polyphenylene sulfide with $Li_2O$ mixture) have shown good results for lithium metal-based anodes and in some cases form liquid crystal electrolyte.

The bonding porous polymer film 190 may have a thickness in the range of 5 nanometers to 2,000 micrometer (e.g., in the range of 10 nanometers to 600 nanometers; in the range of 50 nanometers to 100 nanometers; in the range of 100 nanometers to 200 nanometers; in the range of 100 nanometers to 150 nanometers).

The separator film 130 is formed between the anode electrode structure 110 and the cathode electrode structure 120. The separator film 130 comprises a porous (e.g., microporous) polymeric substrate capable of conducting ions (e.g., a separator film) with pores. In some implementations, the porous polymeric substrate itself does not need to be ion conducting, however, once filled with electrolyte (liquid, gel, solid, combination etc.), the combination of porous substrate and electrolyte is ion conducting. In one implementation, the porous polymeric substrate is a multi-film polymeric substrate. In one implementation, the pores are micropores. In some implementations, the porous polymeric substrate consists of any commercially available polymeric microporous membranes (e.g., single-ply or multi-ply), for example, those products produced by Polypore (Celgard Inc., of Charlotte, N.C.), Toray Tonen (Battery separator film (BSF)), SK Energy (Li-ion battery separator (LiBS), Evonik industries (SEPARION® ceramic separator membrane), Asahi Kasei (Hipore™ polyolefin flat film membrane), DuPont (Energain®), etc. In some implementations, the porous polymeric substrate has a porosity in the range of 20 to 80% (e.g., in the range of 28 to 60%). In some implementations, the porous polymeric substrate has an average pore size in the range of 0.02 to 5 microns (e.g., 0.08 to 2 microns). In some implementations, the porous polymeric substrate has a Gurley Number in the range of 15 to 150 seconds. In some implementations, the porous polymeric substrate is polyolefinic. Exemplary polyolefins include polypropylene, polyethylene, or combinations thereof.

In some implementations where the energy storage device 100 is a solid-state battery, the separator film 130 is replaced by a lithium-ion conducting glass. The lithium-ion conducting material may be a lithium-ion conducting ceramic or a lithium-ion conducting glass. The Li-ion conducting material may be comprised of one or more of LiPON, doped variants of either crystalline or amorphous phases of $Li_7La_3Zr_2O_{12}$, doped anti-perovskite compositions, $Li_2S$—$P_2S_5$, $Li_{10}GeP_2S_{12}$, and $Li_3PS_4$, lithium phosphate glasses, $(1-x)LiI$-$(x)Li_4SnS_4$, $xLiI$-$(1-x)Li_4SnS_4$, mixed sulfide and oxide electrolytes (crystalline LLZO, amorphous $(1-x)LiI$-$(x)Li_4SnS_4$ mixture, and amorphous $xLiI$-$(1-x)Li_4SnS_4$) for example. In one implementation, x is between 0 and 1 (e.g., 0.1, 0.2, 0.3, 0.4, 0.5, 0.6, 0.7, 0.8, and 0.9).

Electrolytes infused in the anode electrode structure 110, the cathode electrode structure 120 and the separator film 130 can be comprised of a liquid/gel or a solid polymer and may be different in each. In some implementations, the electrolyte primarily includes a salt and a medium (e.g., in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, Minn.) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF: chlorotrifluoroethylene) PAN (polyacrylonitrile), and PEO (polyethylene oxide). In one implementation, the electrolyte is a solvent in salt wherein the percentage of solvent is much lower than the percentage of solvent in a typical electrolyte.

Figure 2:
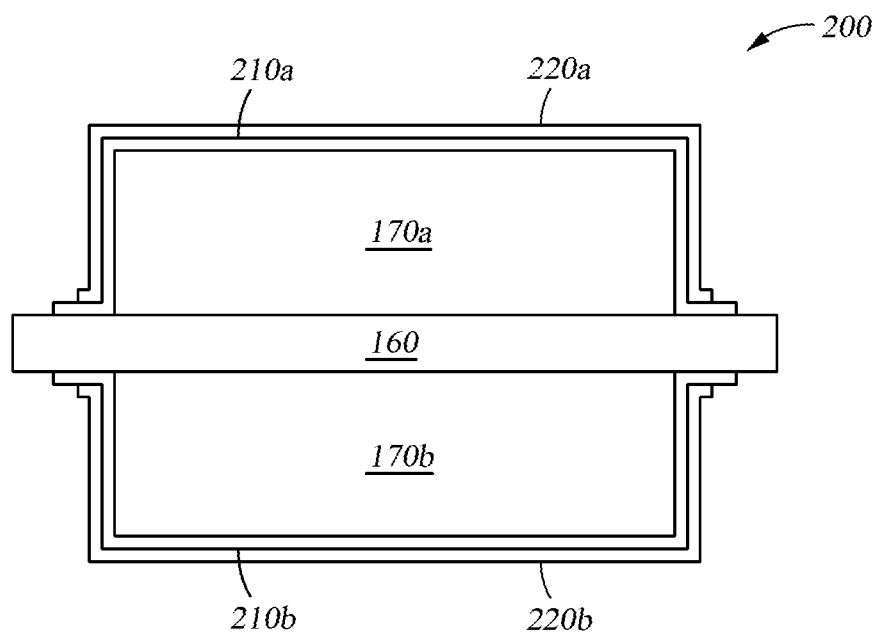
FIG. 2 illustrates a cross-sectional view of one implementation of a dual-sided anode electrode structure formed according to implementations described herein.

FIG. 2 illustrates a cross-sectional view of one implementation of an anode electrode structure 200 formed according to implementations described herein. Note in FIG. 2 that the anode current collector 160 is shown to extend beyond the stack, although it is not necessary for the anode current collector 160 to extend beyond the stack, the portions extending beyond the stack may be used as tabs. Although the anode electrode structure 200 is depicted as a dual-sided electrode structure, it should be understood that the implementations described herein also apply to single-sided electrode structures.

The anode electrode structure 200 has the anode current collector 160, anode films 170a, 170b (collectively 170) formed on opposing sides of the anode current collector 160. In one implementation, the anode film 170 is a lithium metal film. In one implementation, the anode film 170 has a thickness of 20 micrometers or less (e.g., from about 1 micrometer to about 20 micrometer). A metal film 210a, 210b (collectively 210) is formed on each of the anode films 170a, 170b. In one implementation, the metal film is selected from a copper film, a bismuth film, or a tin film. In one implementation, the metal film is an ultra-thin metal film having a thickness of 100 nanometers or less (e.g., from about 5 nanometers to 100 nanometers; from about 5 nanometers to about 40 nanometers; from about 10 nanometers to about 20 nanometers; or from about 50 nanometers to about 100 nanometers). In some implementations, as depicted in FIG. 2, the metal film 210 coats the exposed surfaces (e.g., top surface and sidewalls) of the anode film 170 extending to contact the anode current collector 160. A protective film 220a, 220b (collectively 220) is formed on each of the metal films 210a, 210b. In some implementations, the protective film 220 is permeable to at least one of lithium ions and lithium atoms. In one implementation, the protective film 220 is selected from the group comprising lithium-ion conducting ceramic, a lithium-ion conducting glass, or ion conducting liquid crystal. The protective film 220 may have a thickness in the range of 5 nanometers to 2,000 micrometer (e.g., in the range of 10 nanometers to 600 nanometers; in the range of 50 nanometers to 100 nanometers; in the range of 100 nanometers to 200 nanometers; in the range of 100 nanometers to 150 nanometers).

Figure 3:
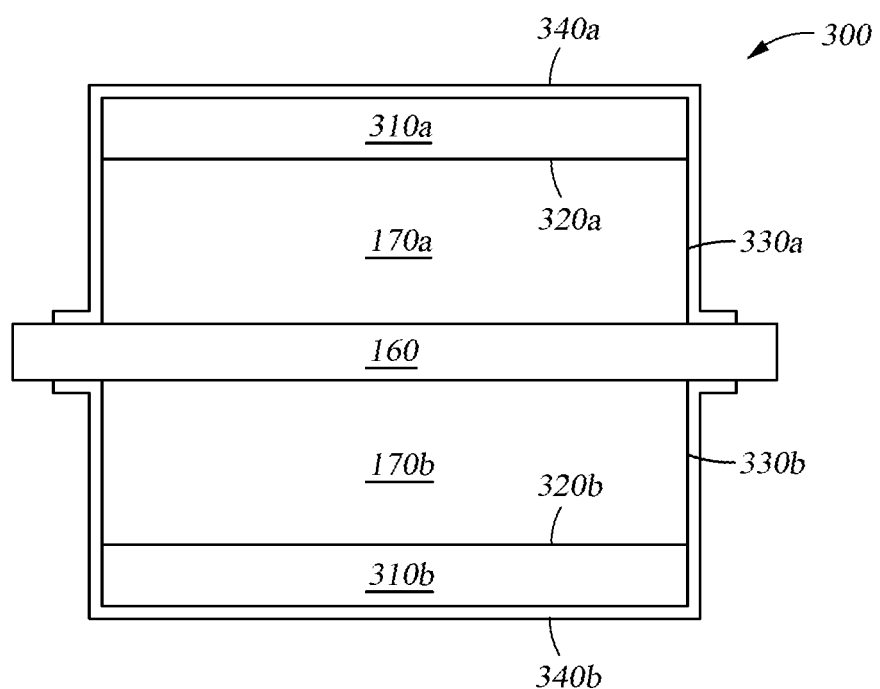
FIG. 3 illustrates a cross-sectional view of another implementation of a dual-sided anode electrode structure formed according to implementations described herein.

FIG. 3 illustrates a cross-sectional view of another implementation of an anode electrode structure 300 formed according to implementations described herein. Note in FIG. 3 that the anode current collector 160 is shown to extend beyond the stack, although it is not necessary for the anode current collector 160 to extend beyond the stack, the portions extending beyond the stack may be used as tabs. Although the anode electrode structure 300 is depicted as a dual-sided electrode structure, it should be understood that the implementations described herein also apply to single-sided electrode structures.

The anode electrode structure 300 has the anode current collector 160, anode films 170a, 170b (collectively 170) formed on opposing sides of the anode current collector 160. In one implementation, the anode film 170 is a silicon graphite film. In one implementation, the anode film 170 has a thickness of 100 micrometers or less (e.g., from about 1 μm to about 100 μm; from about 10 μm to about 30 μm; from about 20 μm to about 30 μm; from about 3 μm to about 20 μm; or from about 50 μm to about 100 μm). A lithium metal film 310a, 310b (collectively 310) is formed on a top surface 320a, 320b (collectively 320) of each of the anode films 170a, 170b. In some implementation, the lithium metal film 310 is formed on the exposed surfaces of the anode film 170 including the top surface 320 and the sidewalls 330a, 330b (collectively 330). The lithium metal film 310 replenishes first cycle capacity loss of silicon blended graphite anodes. The lithium metal film 310 is an ultra-thin lithium film having a thickness of 20 nanometers or less (e.g., from about 1 nanometer to about 20 nanometers; from about 1 nanometer to about 10 nanometers; or from about 5 nanometers to about 10 nanometers).

In some implementations, as depicted in FIG. 3, a protective film 340a, 340b (collectively 340) coats the exposed surfaces of the lithium metal film 310 and the exposed surfaces (e.g., top surface and sidewalls) of the anode film 170 extending to contact the anode current collector 160. In some implementations, the protective film 340 is permeable to at least one of lithium ions and lithium atoms. In one implementation, the protective film 340 is selected from the group comprising lithium-ion conducting ceramic, a lithium-ion conducting glass, or ion conducting liquid crystal. The protective film 340 may have a thickness in the range of 5 nanometers to 2,000 micrometer (e.g., in the range of 10 nanometers to 600 nanometers; in the range of 50 nanometers to 100 nanometers; in the range of 100 nanometers to 200 nanometers; in the range of 100 nanometers to 150 nanometers).

Figure 4:
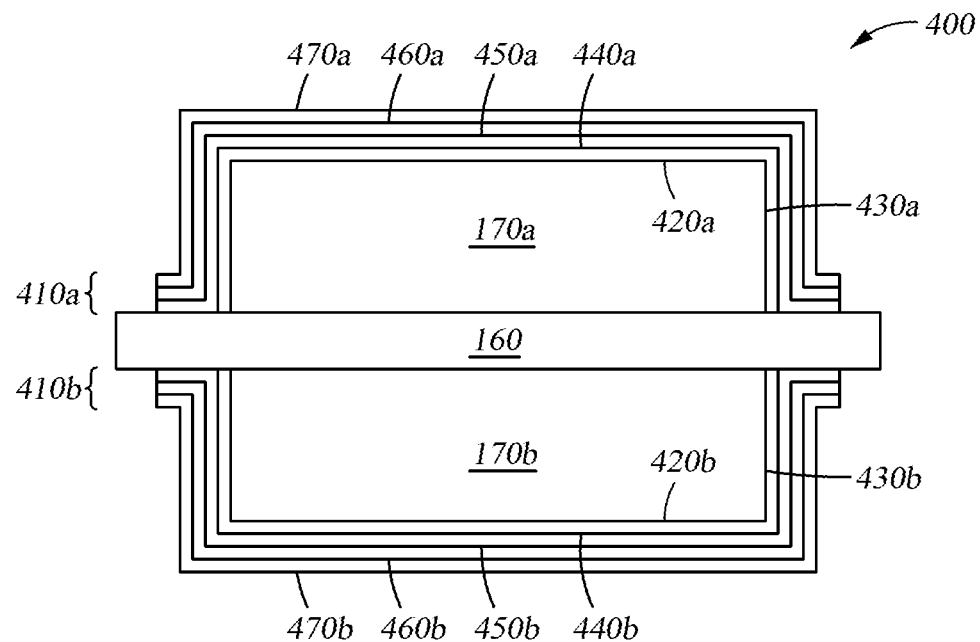
FIG. 4 illustrates a cross-sectional view of another implementation of a dual-sided anode electrode structure formed according to implementations described herein.

FIG. 4 illustrates a cross-sectional view of another implementation of an anode electrode structure 400 formed according to implementations described herein. Note in FIG. 4 that the anode current collector 160 is shown to extend beyond the stack, although it is not necessary for the anode current collector 160 to extend beyond the stack, the portions extending beyond the stack may be used as tabs. Although the anode electrode structure 400 is depicted as a dual-sided electrode structure, it should be understood that the implementations described herein also apply to single-sided electrode structures.

The anode electrode structure 400 has the anode current collector 160, anode films 170a, 170b (collectively 170) formed on opposing sides of the anode current collector 160. In one implementation, the anode film 170 is a silicon graphite film. In one implementation, the anode film 170 is a lithium metal film. In one implementation, the anode film 170 has a thickness of 100 micrometers or less (e.g., from about 1 μm to about 100 μm; from about 10 μm to about 30 μm; from about 20 μm to about 30 μm; from about 3 μm to about 20 μm; or from about 50 μm to about 100 μm). A protective film stack 410a, 410b (collectively 410) is formed on the anode film 170. In some implementations, the protective film stack 410 is formed over the exposed surfaces of the anode film 170 including the top surface 420a, 420b (collectively 420) and the sidewalls 430a, 430b (collectively 430) of the anode film 170. The protective film stack 410 includes a protective film 440a, 440b (collectively 440), a first polymer film 450a, 450b (collectively 450) formed over the protective film stack 410, a ceramic film 460a, 460b (collectively 460) formed over the first polymer film 450, and a second polymer film 470a, 470b (collectively 470) formed over the ceramic film 460.

The protective film 440 is selected from the group of lithium fluoride (LiF), aluminum oxide, aluminum oxyhydroxide (AlO(OH)), a copper chalcogenide (e.g., CuS, $Cu_2Se$, $Cu_2S$), bismuth chalcogenide (e.g., $Bi_2Te_3$, $Bi_2Se_3$), lithium carbonate ($Li_2CO_3$), and combinations thereof. In one implementation, the protective film 440 is a lithium carbonate film ($Li_2CO_3$). In one implementation, the protective film 440 is an ultra-thin film having a thickness of 20 nanometers or less (e.g., from about 1 nanometer to about 20 nanometers; from about 1 nanometer to about 10 nanometers; or from about 5 nanometers to about 10 nanometers). In some implementations, the protective film 440 is formed over the exposed surfaces of the anode film 170 including the top surface 420a, 420b (collectively 420) and the sidewalls 430a, 430b (collectively 430) of the anode film 170.

The first polymer film 450 is formed over the protective film 440. The first polymer film 450 functions as a bonding layer and enhances ion conduction. In one implementation, the first polymer film 450 is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the first polymer film 450 has a thickness of 20 nanometers or less (e.g., from about 1 nanometer to about 20 nanometers; from about 1 nanometer to about 10 nanometers; or from about 5 nanometers to about 10 nanometers). In some implementations, the first polymer film 450 is formed over the exposed surfaces of the protective film 440 including the top surface and the sidewalls of the protective film 440.

The ceramic film 460 is formed over the first polymer film 450. The ceramic film 460 functions as a lithium-ion conducting enhancer and blocks dendrites. In one implementation, the ceramic film 460 is a porous film. The ceramic film 460 may be similar to the ceramic coating 185. In one implementation, the ceramic film 460 is selected from the group comprising: LiPON, crystalline or amorphous phases of garnet-type $Li_7La_3Zr_2O_{12}$, LISICON (e.g., $Li_{2+2x}Zn_{1-x}GeO_4$ wherein 0<x<1), NASICON (e.g., $Na_{1+x}Zr_2Si_xP_{3-x}O_{12}$ wherein 0<x<3), lithium borohydride ($LiBH_4$), doped anti-perovskite compositions, lithium containing sulfides (e.g., $Li_2S$, $Li_2S$—$P_2S_5$, $Li_{10}GeP_2S_{12}$ and $Li_3PS_4$), and lithium argyrodites (e.g., $LiPS_5X$ wherein x is Cl, Br or I). In one implementation, the ceramic film 460 has a thickness of 20 nanometers or less (e.g., from about 1 nanometer to about 20 nanometers; from about 1 nanometer to about 10 nanometers; or from about 5 nanometers to about 10 nanometers). In some implementations, the ceramic film 460 is formed over the exposed surfaces of the first polymer film 450 including the top surface and the sidewalls of the first polymer film 450.

The second polymer film 470 is formed over the ceramic film 460. The second polymer film 470 functions as a bonding layer and enhances ion conduction. In one implementation, the second polymer film 470 is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the second polymer film 470 has a thickness of 20 nanometers or less (e.g., from about 1 nanometer to about 20 nanometers; from about 1 nanometer to about 10 nanometers; or from about 5 nanometers to about 10 nanometers). In some implementations, the second polymer film 470 is formed over the exposed surfaces of the ceramic film 460 including the top surface and the sidewalls of the the ceramic film 460.

Figure 5:
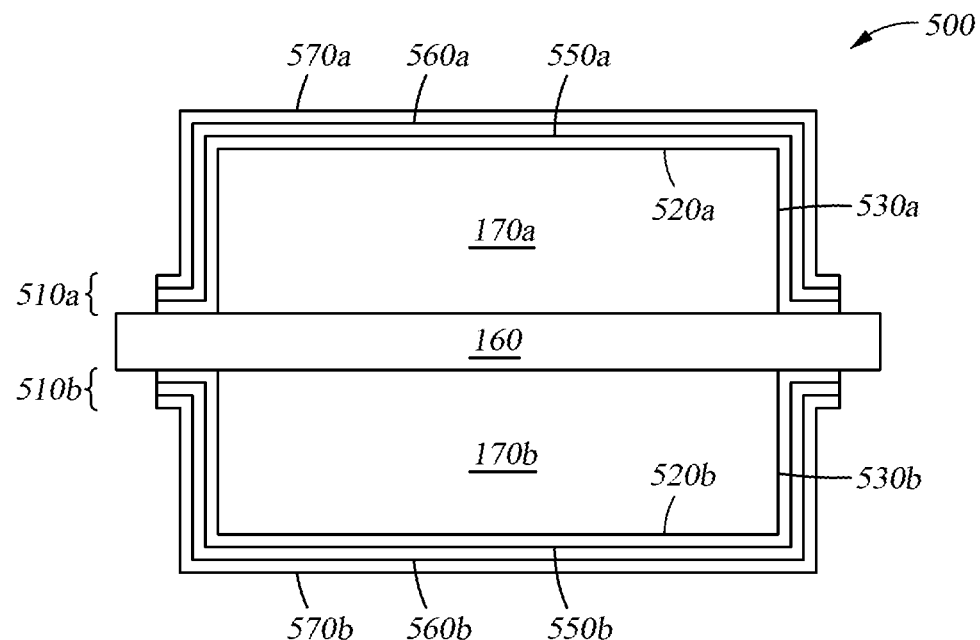
FIG. 5 illustrates a cross-sectional view of another implementation of a dual-sided anode electrode structure formed according to implementations described herein.

FIG. 5 illustrates a cross-sectional view of another implementation of an anode electrode structure 500 formed according to implementations described herein. Note in FIG. 5 that the anode current collector 160 is shown to extend beyond the stack, although it is not necessary for the anode current collector 160 to extend beyond the stack, the portions extending beyond the stack may be used as tabs. Although the anode electrode structure 500 is depicted as a dual-sided electrode structure, it should be understood that the implementations described herein also apply to single-sided electrode structures.

The anode electrode structure 500 has the anode current collector 160, anode films 170a, 170b (collectively 170) formed on opposing sides of the anode current collector 160. In one implementation, the anode film 170 is a silicon graphite film. In one implementation, the anode film 170 has a thickness of 100 micrometers or less (e.g., from about 1 μm to about 100 μm; from about 10 μm to about 30 μm; from about 20 μm to about 30 μm; from about 3 μm to about 20 μm; or from about 50 μm to about 100 μm). In one implementation, the anode film 170 is a lithium metal film. A protective film stack 510a, 510b (collectively 510) is formed on the anode film 170. In some implementations, the protective film stack 510 is formed over the exposed surfaces of the anode film 170 including the top surface 520a, 520b (collectively 520) and the sidewalls 530a, 530b (collectively 530) of the anode film 170. The protective film stack 510 includes a first polymer film 550a, 550b (collectively 550) formed over the exposed surfaces of the anode film 170, a dielectric film 560a, 560b (collectively 560) formed over the first polymer film 550, and a second polymer film 570a, 570b (collectively 570) formed over the dielectric film 560.

The first polymer film 550 is formed over the anode film 170. The first polymer film 550 functions as a bonding layer and enhances ion conduction. In one implementation, the first polymer film 550 is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the first polymer film 550 has a thickness of 20 nanometers or less (e.g., from about 1 nanometer to about 20 nanometers; from about 1 nanometer to about 10 nanometers; or from about 5 nanometers to about 10 nanometers). In some implementations, the first polymer film 550 is formed over the exposed surfaces of the anode film 170 including the top surface 520 and the sidewalls 530 of the anode film 170.

The dielectric film 560 is formed over the first polymer film 550. The dielectric film 560 functions as a lithium-ion conducting enhancer and blocks dendrites. In one implementation, the dielectric film 560 is a porous film. The dielectric film 560 may be similar to the ceramic coating 185. In one implementation, the dielectric film 560 is selected from the group comprising: LiPON, crystalline or amorphous phases of garnet-type $Li_7La_3Zr_2O_{12}$, LISICON (e.g., $Li_{2+2x}Zn_{1-x}GeO_4$ wherein 0<x<1), NASICON (e.g., $Na_{1+x}Zr_2Si_xP_{3-x}O_{12}$ wherein 0<x<3), lithium borohydride ($LiBH_4$), doped anti-perovskite compositions, lithium containing sulfides (e.g., $Li_2S$, $Li_2S$—$P_2S_5$, $Li_{10}GeP_2S_{12}$ and $Li_3PS_4$), and lithium argyrodites (e.g., $LiPS_5X$ wherein x is Cl, Br or I). In one implementation, the dielectric film 560 has a thickness of 20 nanometers or less (e.g., from about 1 nanometer to about 20 nanometers; from about 1 nanometer to about 10 nanometers; or from about 5 nanometers to about 10 nanometers). In some implementations, the dielectric film 560 is formed over the exposed surfaces of the first polymer film 550 including the top surface and the sidewalls of the first polymer film 550.

The second polymer film 570 is formed over the dielectric film 560. The second polymer film 570 functions as a bonding layer and enhances ion conduction. In one implementation, the second polymer film 570 is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the second polymer film 570 has a thickness of 20 nanometers or less (e.g., from about 1 nanometer to about 20 nanometers; from about 1 nanometer to about 10 nanometers; or from about 5 nanometers to about 10 nanometers). In some implementations, the second polymer film 570 is formed over the exposed surfaces of the dielectric film 560 including the top surface and the sidewalls of the dielectric film 560.

Figure 6:
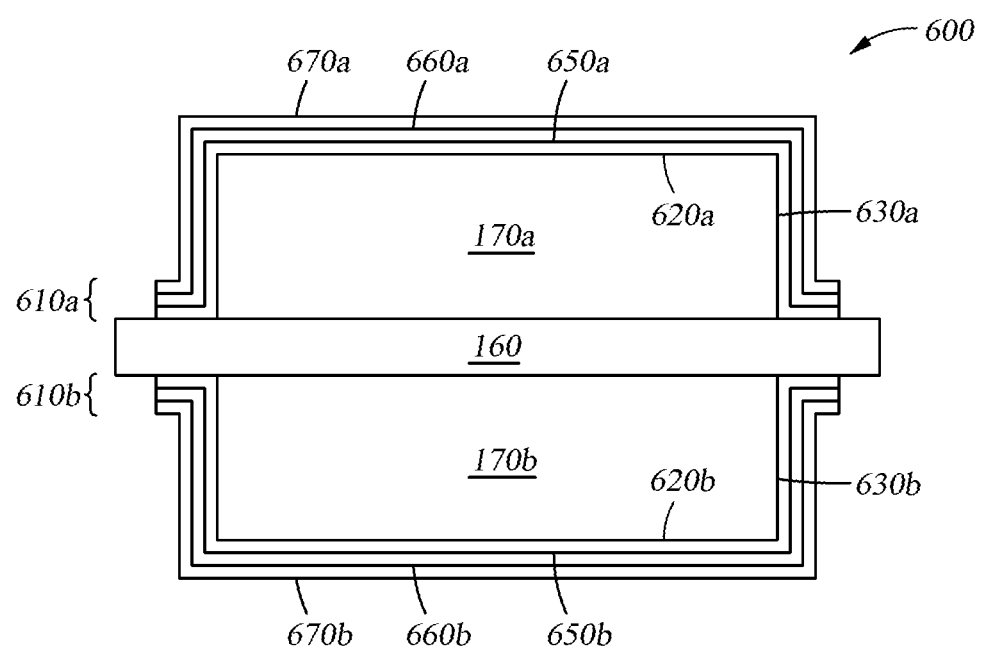
FIG. 6 illustrates a cross-sectional view of another implementation of a dual-sided anode electrode structure formed according to implementations described herein.

FIG. 6 illustrates a cross-sectional view of another implementation of an anode electrode structure 600 formed according to implementations described herein. Note in FIG. 6 that the anode current collector 160 is shown to extend beyond the stack, although it is not necessary for the anode current collector 160 to extend beyond the stack, the portions extending beyond the stack may be used as tabs. Although the anode electrode structure 600 is depicted as a dual-sided electrode structure, it should be understood that the implementations described herein also apply to single-sided electrode structures.

The anode electrode structure 600 has the anode current collector 160, anode films 170a, 170b (collectively 170) formed on opposing sides of the anode current collector 160. In one implementation, the anode film 170 is a silicon graphite film. In one implementation, the anode film 170 has a thickness of 100 micrometers or less (e.g., from about 1 μm to about 100 μm; from about 10 μm to about 30 μm; from about 20 μm to about 30 μm; from about 3 μm to about 20 μm; or from about 50 μm to about 100 μm). In one implementation, the anode film 170 is a lithium metal film. A protective film stack 610a, 610b (collectively 610) is formed on the anode film 170. In some implementations, the protective film stack 610 is formed over the exposed surfaces of the anode film 170 including the top surface 620a, 620b (collectively 620) and the sidewalls 630a, 630b (collectively 630) of the anode film 170. The protective film stack 610 includes a metal film 650a, 650b (collectively 650) formed over the exposed surfaces of the anode film 170, a dielectric film 660a, 660b (collectively 660) formed over the metal film 650, and a polymer film 670a, 670b (collectively 670) formed over the dielectric film 660.

The metal film 650 is formed over the anode film 170. The metal film 650 functions as a protective film. The metal film 650 may be similar to the protective film 175. In one implementation, the metal film 650 is an ultra-thin metal seed film. The metal film 650 may be a copper film. The copper film may be an ultra-thin copper film. In one implementation, the metal film 650 has a thickness of 20 nanometers or less (e.g., from about 1 nanometer to about 20 nanometers; from about 1 nanometer to about 10 nanometers; or from about 5 nanometers to about 10 nanometers). In some implementations, the metal film 650 is formed over the exposed surfaces of the anode film 170 including the top surface 620 and the sidewalls 630 of the anode film 170.

The dielectric film 660 is formed over the metal film 650. The dielectric film 660 functions as a lithium-ion conducting enhancer and blocks dendrites. In one implementation, the dielectric film 660 is a porous film. The dielectric film 660 may be similar to the ceramic coating 185. In one implementation, the dielectric film 660 is selected from the group comprising: LiPON, crystalline or amorphous phases of garnet-type $Li_7La_3Zr_2O_{12}$, LISICON (e.g., $Li_{2+2x}Zn_{1-x}GeO_4$ wherein 0<x<1), NASICON (e.g., $Na_{1+x}Zr_2Si_xP_{3-x}O_{12}$ wherein 0<x<3), lithium borohydride ($LiBH_4$), doped anti-perovskite compositions, lithium containing sulfides (e.g., $Li_2S$, $Li_2S—P_2S_5$, $Li_{10}GeP_2S_{12}$ and $Li_3PS_4$), and lithium argyrodites (e.g., $LiPS_5X$ wherein x is Cl, Br or I). In one implementation, the dielectric film 660 has a thickness of 20 nanometers or less (e.g., from about 1 nanometer to about 20 nanometers; from about 1 nanometer to about 10 nanometers; or from about 5 nanometers to about 10 nanometers). In some implementations, the dielectric film 660 is formed over the exposed surfaces of the metal film 650 including the top surface and the sidewalls of the metal film 650.

The polymer film 670 is formed over the dielectric film 660. The polymer film 670 functions as a bonding layer and enhances ion conduction. In one implementation, the polymer film 670 is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the polymer film 670 has a thickness of 20 nanometers or less (e.g., from about 1 nanometer to about 20 nanometers; from about 1 nanometer to about 10 nanometers; or from about 5 nanometers to about 10 nanometers). In some implementations, the polymer film 670 is formed over the exposed surfaces of the dielectric film 660 including the top surface and the sidewalls of the dielectric film 660.

Figure 7:
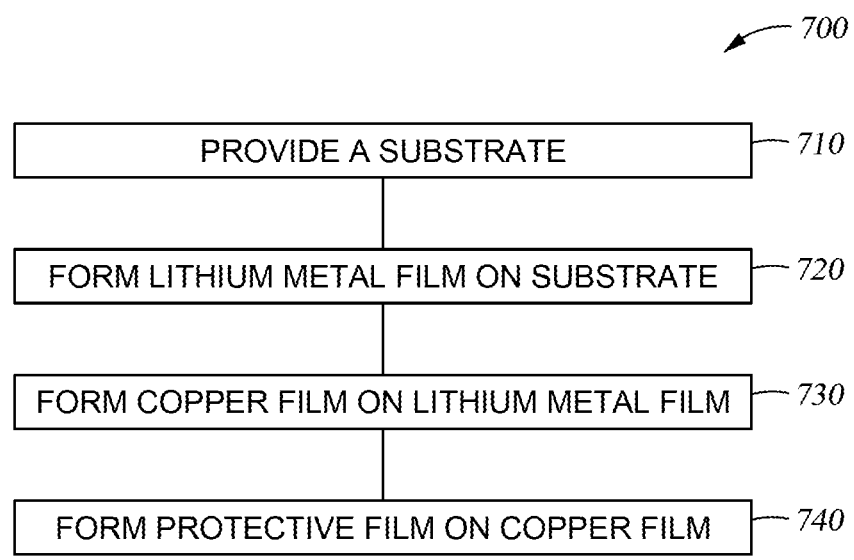
FIG. 7 illustrates a process flow chart summarizing one implementation of a method for forming an anode electrode structure according to implementations described herein.
Figure 12:
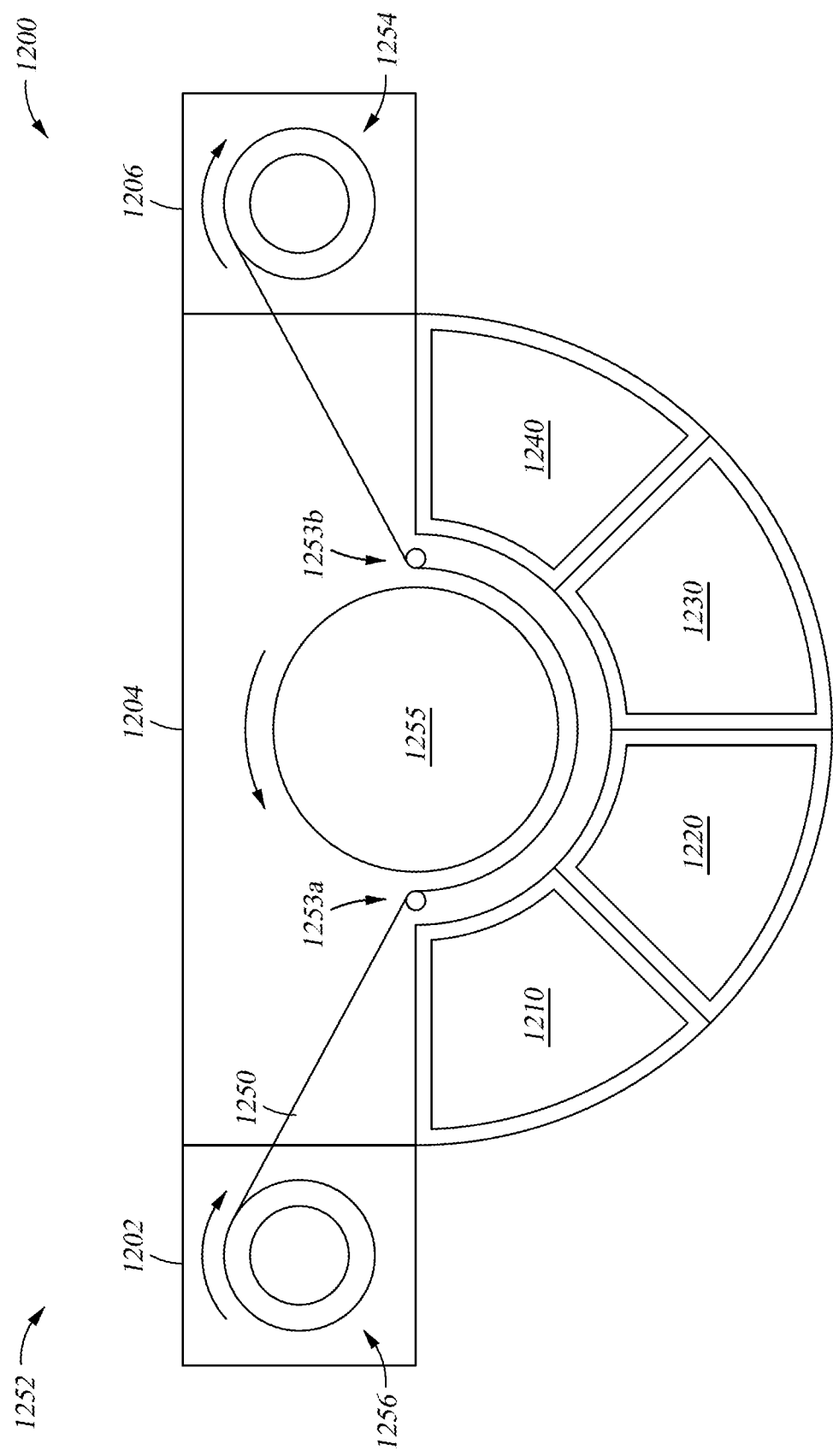
FIG. 12 illustrates a schematic view of an integrated processing tool for forming anode electrode structures according to implementations described herein.

FIG. 7 illustrates a process flow chart summarizing one implementation of a method 700 for forming an anode electrode structure according to implementations described herein. The anode electrode structure may be the anode electrode structure 200 depicted in FIG. 2. At operation 710, a substrate is provided. In one implementation, the substrate is a continuous sheet of material 1250 as shown in FIG. 12. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 720, a lithium metal film is formed on the substrate. In one implementation, the lithium metal film is the anode film 170 and the substrate is the anode current collector 160. In one implementation, the lithium metal film is formed on a copper current collector. In some implementations, if an anode film is already present on the substrate, the lithium metal film is formed on the anode film. If the anode film 170 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system.

At operation 730, a metal film is formed on the lithium metal film. In one implementation, the metal film is a copper film, a bismuth film or a tin film. With reference to FIG. 2, the metal film may be the metal film 210 and the lithium metal film may be anode film 170. In one implementation, the metal film is selected from a copper film, a bismuth film, a tin film, or combinations thereof. In one implementation, the metal film is an ultra-thin copper film having a thickness of 100 nanometers or less (e.g., from about 5 nanometers to 100 nanometers; from about 10 nanometers to about 20 nanometers; or from about 50 nanometers to about 100 nanometers). Any suitable copper film deposition process for depositing thin films of copper may be used to deposit the thin film of copper. Deposition of the thin film of copper may be by PVD processes, such as evaporation, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system.

At operation 740, a protective film may be formed on the metal film. With reference to FIG. 2, the protective film may be the protective film 220 and the copper film may be the metal film 210. In some implementations, the protective film 220 is permeable to at least one of lithium ions and lithium atoms. In one implementation, the protective film 220 is selected from the group comprising lithium-ion conducting ceramic, a lithium-ion conducting glass, ion conducting polymer, ion conducting liquid crystal, composite combinations thereof, or unit layer combinations thereof. The protective film 220 may have a thickness in the range of 5 nanometers to 2,000 micrometer (e.g., in the range of 10 nanometers to 600 nanometers; in the range of 50 nanometers to 100 nanometers; in the range of 100 nanometers to 200 nanometers; in the range of 100 nanometers to 150 nanometers). The protective film 220 can be directly deposited on the copper film using either a Physical Vapor Deposition (PVD), Chemical Vapor Deposition (CVD), spray, doctor blade, printing or any of a number of coating methods. A suitable method for some implementations is PVD. In some implementations, the protective film 220 does not need to be ion conducting, however, once filled with electrolyte (liquid, gel, solid, combination etc.), the combination of porous substrate and electrolyte is ion conducting.

Figure 8:
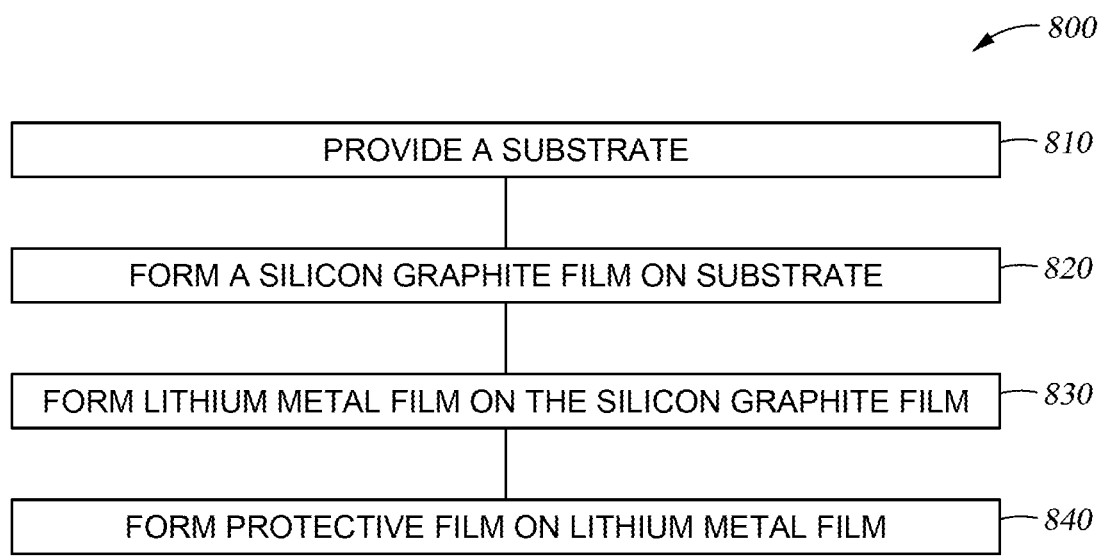
FIG. 8 illustrates a process flow chart summarizing one implementation of a method for forming an anode electrode structure according to implementations described herein.

FIG. 8 illustrates a process flow chart summarizing one implementation of a method 800 for forming an anode electrode structure according to implementations described herein. The anode electrode structure may the anode electrode structure 300 depicted in FIG. 3. At operation 810, a substrate is provided. In one implementation, the substrate is a continuous sheet of material 1250. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 820, a silicon graphite film is formed on the substrate. In one implementation, the silicon graphite film is the anode film 170 and the substrate is the anode current collector 160. In one implementation, the silicon graphite film is formed on a copper current collector. The silicon graphite film may be formed in a first processing chamber 1210 (See FIG. 12). Any suitable silicon graphite film deposition process for depositing thin films of silicon graphite may be used to deposit the thin film of silicon graphite. Deposition of the thin film of silicon graphite may be by PVD processes, such as evaporation, a slot-die process, a transfer process, an electroplating process, or a three-dimensional lithium printing process. The chamber for depositing the thin film of silicon graphite may include a PVD system, such as an electron-beam evaporator, a thermal evaporator, or a sputtering system, a thin film transfer system (including large area pattern printing systems such as gravure printing systems) or a slot-die deposition system.

At operation 830, a lithium metal film is formed on the silicon graphite film. Referring to FIG. 3, in one implementation, the lithium metal film is the lithium metal film 310 and the silicon graphite film is the anode film 170. Any suitable lithium metal film deposition process for depositing thin films of lithium metal may be used to deposit the thin film of lithium metal. Deposition of the thin film of lithium metal may be by PVD processes, such as evaporation, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system.

At operation 840, a protective film may be formed on the lithium metal film. With reference to FIG. 3, the protective film may be the protective film 340 and the lithium metal film may be the lithium metal film 310. In some implementations, the protective film 340 is permeable to at least one of lithium ions and lithium atoms. In one implementation, the protective film 340 is selected from the group comprising lithium-ion conducting ceramic, a lithium-ion conducting glass, ion conducting polymer, ion conducting liquid crystal, composite combinations thereof, or unit layer combinations thereof. The protective film 340 may have a thickness in the range of 5 nanometers to 2,000 micrometer (e.g., in the range of 10 nanometers to 600 nanometers; in the range of 50 nanometers to 100 nanometers; in the range of 100 nanometers to 200 nanometers; in the range of 100 nanometers to 150 nanometers). The protective film 340 can be directly deposited on the lithium metal film using either a Physical Vapor Deposition (PVD), Chemical Vapor Deposition (CVD), spray, doctor blade, printing or any of a number of coating methods. A suitable method for some implementations is PVD. In some implementations, the protective film 340 does not need to be ion conducting, however, once filled with electrolyte (liquid, gel, solid, combination etc.), the combination of porous substrate and electrolyte is ion conducting.

Figure 9:
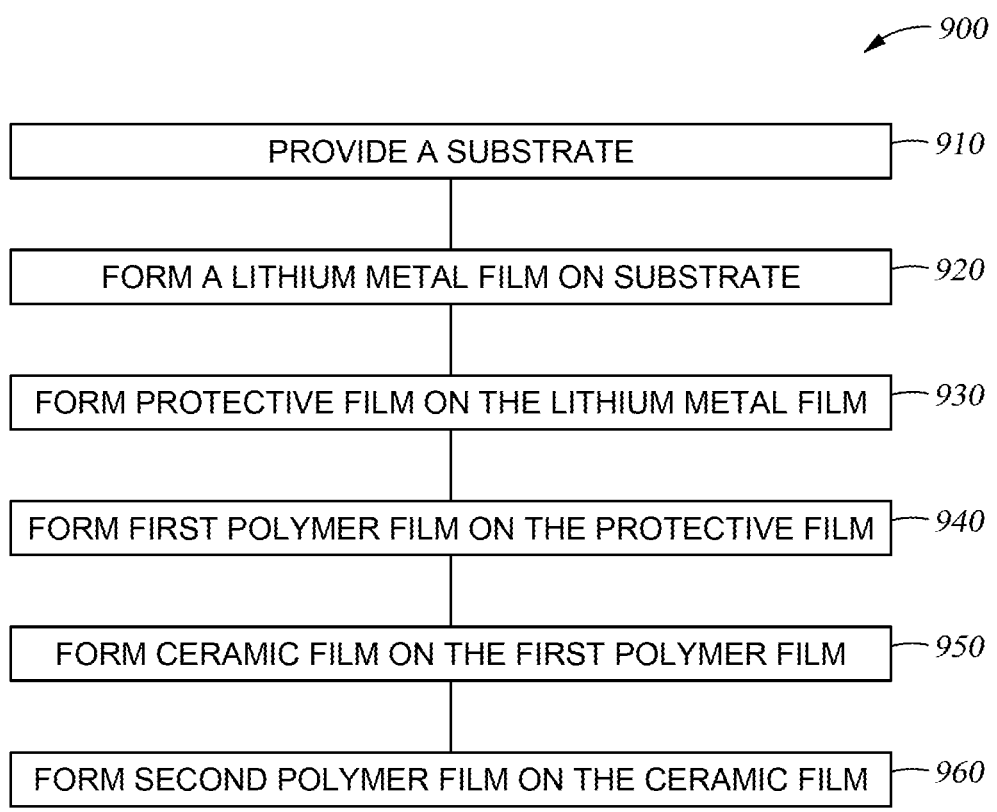
FIG. 9 illustrates a process flow chart summarizing one implementation of a method for forming an anode electrode structure according to implementations described herein.

FIG. 9 illustrates a process flow chart summarizing one implementation of a method 900 for forming an anode electrode structure according to implementations described herein. The anode electrode structure may the anode electrode structure 400 depicted in FIG. 4. At operation 910, a substrate is provided. In one implementation, the substrate is a continuous sheet of material 1250 as shown in FIG. 12. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 920, a lithium metal film is formed on the substrate. In one implementation, the lithium metal film is the anode film 170 and the substrate is the anode current collector 160. In one implementation, the lithium metal film is formed on a copper current collector. In some implementations, if an anode film is already present on the substrate, the lithium metal film is formed on the anode film. If the anode film 170 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system.

At operation 930, a protective film is formed on the lithium metal film. With reference to FIG. 4, the protective film may be the protective film 440 and the lithium metal film may be anode film 170. In one implementation, the protective film is similar to the protective film 175 as describe in relation to FIG. 1. The protective film includes at least one of lithium fluoride (LiF), a metal film (e.g., copper, bismuth, tin, or combinations thereof), a copper chalcogenide (e.g., CuS, $Cu_2Se$, $Cu_2S$), bismuth chalcogenide (e.g., $Bi_2Te_3$, $Bi_2Se_3$), and lithium carbonate ($Li_2CO_3$). The protective film 175 provides surface protection of the anode film 170. The protective film can be directly deposited on the anode film 170 by Physical Vapor Deposition (PVD), such as evaporation or sputtering, atomic layer deposition (ALD), a slot-die process, dip coating, a thin-film transfer process, gravure coating, comma bar coating, kiss-roll coating, or a three-dimensional lithium printing process. PVD is a preferred method for deposition of the protective film. The protective film may be a coating or a discrete layer, either having a thickness in the range of 1 nanometer to 2,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). The protective film may be a discrete film having a thickness in the range of 5 microns to 50 microns (e.g., in the range of 6 microns to 25 microns).

At operation 940, a first polymer film is formed on the protective film. With reference to FIG. 4, the first polymer film may be the first polymer film 450 and the protective film may be the protective film 440. The first polymer film functions as a bonding layer and enhances ion conduction. In one implementation, the first polymer film is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the first polymer film has a thickness of 20 nanometers or less (e.g., from about 1 nanometer to about 20 nanometers; from about 1 nanometer to about 10 nanometers; or from about 5 nanometers to about 10 nanometers). In some implementations, the first polymer film is formed over the exposed surfaces of the protective film including the top surface and the sidewalls of the protective film. The first polymer film can be directly deposited on the protective by Physical Vapor Deposition (PVD), such as evaporation or sputtering, atomic layer deposition (ALD), a slot-die process, dip coating, a thin-film transfer process, gravure coating or a three-dimensional lithium printing process.

At operation 950, a ceramic film is formed on the first polymer film. With reference to FIG. 4, the ceramic film may be the ceramic film 460 and the first polymer film may be the first polymer film 450. The ceramic film functions as a lithium-ion conducting enhancer and blocks dendrites. In one implementation, the ceramic film is a porous film. The ceramic film may be similar to the ceramic coating 185 as described in relation to FIG. 1. In one implementation, the ceramic film is selected from the group comprising: LiPON, crystalline or amorphous phases of garnet-type $Li_7La_3Zr_2O_{12}$, LISICON (e.g., $Li_{2+2x}Zn_{1-x}GeO_4$ wherein 0<x<1), NASICON (e.g., $Na_{1+x}Zr_2Si_xP_{3-x}O_{12}$ wherein 0<x<3), lithium borohydride ($LiBH_4$), doped anti-perovskite compositions, lithium containing sulfides (e.g., $Li_2S$, $Li_2S-P_2S_5$, $Li_{10}GeP_2S_{12}$ and $Li_3PS_4$), and lithium argyrodites (e.g., $LiPS_5X$ wherein x is Cl, Br or I). In one implementation, the ceramic film has a thickness of 20 nanometers or less (e.g., from about 1 nanometer to about 20 nanometers; from about 1 nanometer to about 10 nanometers; or from about 5 nanometers to about 10 nanometers). In some implementations, the ceramic film is formed over the exposed surfaces of the first polymer film including the top surface and the sidewalls of the first polymer film. The ceramic film can be directly deposited on the protective by Physical Vapor Deposition (PVD), such as evaporation or sputtering, atomic layer deposition (ALD), a slot-die process, dip coating, a thin-film transfer process, gravure coating or a three-dimensional lithium printing process.

At operation 960, a second polymer film is formed on the ceramic film. With reference to FIG. 4, the second polymer film may be second polymer film 470 and the ceramic film may be the ceramic film 460. The second polymer film 470 functions as a bonding layer and enhances ion conduction. In one implementation, the second polymer film is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the second polymer film has a thickness of 20 nanometers or less (e.g., from about 1 nanometer to about 20 nanometers; from about 1 nanometer to about 10 nanometers; or from about 5 nanometers to about 10 nanometers). In some implementations, the second polymer film is formed over the exposed surfaces of the ceramic film including the top surface and the sidewalls of the second polymer ceramic film. The second polymer film can be directly deposited on the protective by Physical Vapor Deposition (PVD), such as evaporation or sputtering, atomic layer deposition (ALD), a slot-die process, dip coating, a thin-film transfer process, gravure coating or a three-dimensional lithium printing process.

Figure 10:
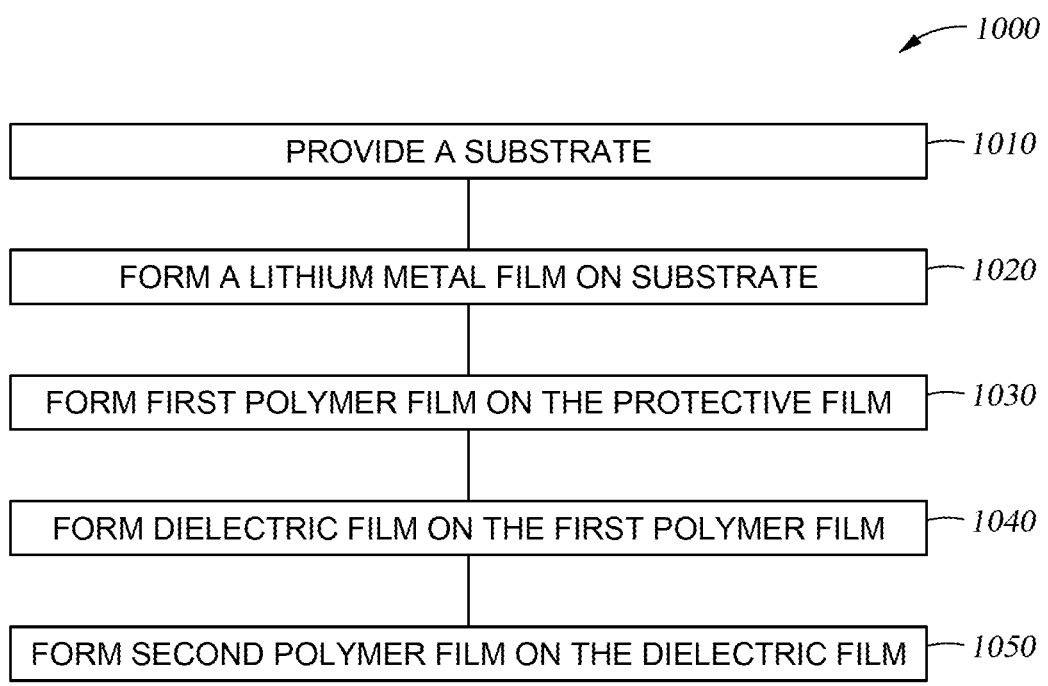
FIG. 10 illustrates a process flow chart summarizing one implementation of a method for forming an anode electrode structure according to implementations described herein.

FIG. 10 illustrates a process flow chart summarizing one implementation of a method 1000 for forming an anode electrode structure according to implementations described herein. The anode electrode structure may be the anode electrode structure 500 depicted in FIG. 5. At operation 1010, a substrate is provided. In one implementation, the substrate is a continuous sheet of material 1250 as shown in FIG. 12. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 1020, a lithium metal film is formed on the substrate. In one implementation, the lithium metal film is the anode film 170 and the substrate is the anode current collector 160. In one implementation, the lithium metal film is formed on a copper current collector. In some implementations, if an anode film is already present on the substrate, the lithium metal film is formed on the anode film. If the anode film 170 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system.

At operation 1030, a first polymer film is formed on the lithium metal film. With reference to FIG. 5, the first polymer film may be the first polymer film 550 and the lithium metal film may be the anode film 170. The first polymer film functions as a bonding layer and enhances ion conduction. In one implementation, the first polymer film is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the first polymer film has a thickness of 20 nanometers or less (e.g., from about 1 nanometer to about 20 nanometers; from about 1 nanometer to about 10 nanometers; or from about 5 nanometers to about 10 nanometers). In some implementations, the first polymer film is formed over the exposed surfaces of the lithium metal film including the top surface and the sidewalls of the lithium metal film. The first polymer film can be directly deposited on the protective by Physical Vapor Deposition (PVD), such as evaporation or sputtering, atomic layer deposition (ALD), a slot-die process, dip coating, a thin-film transfer process, gravure coating or a three-dimensional lithium printing process.

At operation 1040, a dielectric film is formed on the first polymer film. With reference to FIG. 5, the dielectric film may be the dielectric film 560 and the first polymer film may be the first polymer film 550. The dielectric film functions as a lithium-ion conducting enhancer and blocks dendrites. In one implementation, the dielectric film is a porous film. The dielectric film may be similar to the ceramic coating 185 as described in relation to FIG. 1. In one implementation, the dielectric film is selected from the group comprising: LiPON, crystalline or amorphous phases of garnet-type $Li_7La_3Zr_2O_{12}$, LISICON (e.g., $Li_{2+2x}Zn_{1-x}GeO_4$ wherein $0<x<1$), NASICON (e.g., $Na_{1+x}Zr_2Si_xP_{3-x}O_{12}$ wherein $0<x<3$), lithium borohydride ($LiBH_4$), doped anti-perovskite compositions, lithium containing sulfides (e.g., $Li_2S$, $Li_2S-P_2S_5$, $Li_{10}GeP_2S_{12}$ and $Li_3PS_4$), and lithium argyrodites (e.g., $LiPS_5X$ wherein x is Cl, Br or I). In one implementation, the dielectric film has a thickness of 20 nanometers or less (e.g., from about 1 nanometer to about 20 nanometers; from about 1 nanometer to about 10 nanometers; or from about 5 nanometers to about 10 nanometers). In some implementations, the dielectric film is formed over the exposed surfaces of the first polymer film including the top surface and the sidewalls of the first polymer film. The dielectric film can be directly deposited on the protective by chemical vapor deposition (CVD), Physical Vapor Deposition (PVD), such as evaporation or sputtering, atomic layer deposition (ALD), a slot-die process, dip coating, a thin-film transfer process, gravure coating or a three-dimensional lithium printing process.

At operation 1050, a second polymer film is formed on the dielectric film. With reference to FIG. 5, the second polymer film may be second polymer film 570 and the dielectric film may be the dielectric film 560. The second polymer film 570 functions as a bonding layer and enhances ion conduction. In one implementation, the second polymer film is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the second polymer film has a thickness of 20 nanometers or less (e.g., from about 1 nanometer to about 20 nanometers; from about 1 nanometer to about 10 nanometers; or from about 5 nanometers to about 10 nanometers). In some implementations, the second polymer film is formed over the exposed surfaces of the ceramic film including the top surface and the sidewalls of the ceramic film. The second polymer film can be directly deposited on the protective by Physical Vapor Deposition (PVD), such as evaporation or sputtering, atomic layer deposition (ALD), a slot-die process, dip coating, a thin-film transfer process, gravure coating or a three-dimensional lithium printing process.

Figure 11:
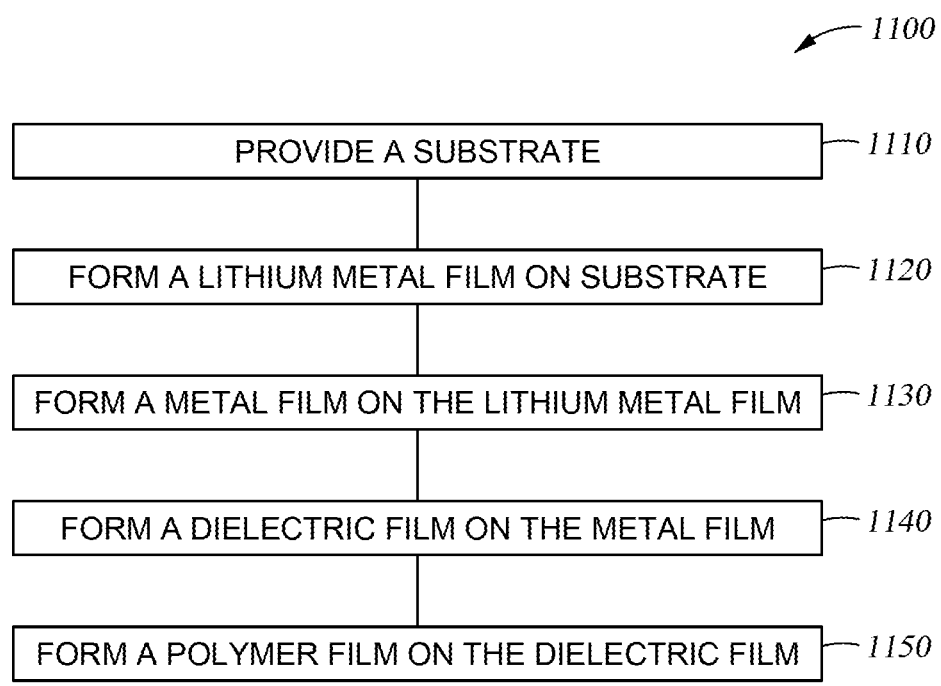
FIG. 11 illustrates a process flow chart summarizing one implementation of a method for forming an anode electrode structure according to implementations described herein.

FIG. 11 illustrates a process flow chart summarizing one implementation of a method 1100 for forming an anode electrode structure according to implementations described herein. The anode electrode structure may the anode electrode structure 600 depicted in FIG. 6. At operation 1110, a substrate is provided. In one implementation, the substrate is a continuous sheet of material 1250 as shown in FIG. 12. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 1120, a lithium metal film is formed on the substrate. In one implementation, the lithium metal film is the anode film 170 and the substrate is the anode current collector 160. In one implementation, the lithium metal film is formed on a copper current collector. In some implementations, if an anode film is already present on the substrate, the lithium metal film is formed on the anode film. If the anode film 170 is not present, the lithium metal film may be formed directly on the substrate. The lithium metal film may be formed in the first processing chamber 1210 and/or the second processing chamber 1220. Any suitable lithium metal film deposition process for depositing thin films of lithium metal may be used to deposit the thin film of lithium metal. Deposition of the thin film of lithium metal may be by PVD processes, such as evaporation, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems, comma bar printing, or kiss-roll coating) or a slot-die deposition system.

At operation 1130, a metal film is formed on the lithium metal film. With reference to FIG. 6, the metal film may be the metal film 650 and the lithium metal film may be the anode film 170. In one implementation, the metal film is an ultra-thin metal film having a thickness of 100 nanometers or less (e.g., from about 5 nanometers to 100 nanometers; from about 10 nanometers to about 20 nanometers; or from about 50 nanometers to about 100 nanometers). In one implementation, the metal film is a copper film. Any suitable metal film deposition process for depositing thin films of metal may be used to deposit the thin film of metal. Deposition of the metal film may be by PVD processes, such as evaporation, a slot-die process, a transfer process, or a three-dimensional lithium printing process. The chamber for depositing the metal film may include a PVD system, such as an electron-beam evaporator, a thermal evaporator, or a sputtering system, a thin film transfer system (including large area pattern printing systems such as gravure printing systems, comma bar printing, or kiss-roll coating) or a slot-die deposition system.

At operation 1140, a dielectric film is formed on the metal film. With reference to FIG. 6, the dielectric film may be dielectric film 660 and the metal film may be the metal film 650. The dielectric film functions as a lithium-ion conducting enhancer and blocks dendrites. In one implementation, the dielectric film is a porous film. The dielectric film may be similar to the ceramic coating 185 as described in relation to FIG. 1. In one implementation, the dielectric film is selected from the group comprising: LiPON, crystalline or amorphous phases of garnet-type $Li_7La_3Zr_2O_{12}$, LISICON (e.g., $Li_{2+2x}Zn_{1-x}GeO_4$ wherein 0<x<1), NASICON (e.g., $Na_{1+x}Zr_2Si_xP_{3-x}O_{12}$ wherein 0<x<3), lithium borohydride ($LiBH_4$), doped anti-perovskite compositions, lithium containing sulfides (e.g., $Li_2S$, $Li_2S$—$P_2S_5$, $Li_{10}GeP_2S_{12}$ and $Li_3PS_4$), and lithium argyrodites (e.g., $LiPS_5X$ wherein x is Cl, Br or I). In one implementation, the dielectric film has a thickness of 20 nanometers or less (e.g., from about 1 nanometer to about 20 nanometers; from about 1 nanometer to about 10 nanometers; or from about 5 nanometers to about 10 nanometers). In some implementations, the dielectric film is formed over the exposed surfaces of the first polymer film including the top surface and the sidewalls of the first polymer film. The dielectric film can be directly deposited on the protective by chemical vapor deposition (CVD), Physical Vapor Deposition (PVD), such as evaporation or sputtering, atomic layer deposition (ALD), a slot-die process, dip coating, a thin-film transfer process, gravure coating or a three-dimensional lithium printing process.

At operation 1150, a polymer film is formed on the dielectric film. With reference to FIG. 6, the polymer film may be polymer film 670 and the dielectric film may be the dielectric film 660. The polymer film 670 functions as a bonding layer and enhances ion conduction. In one implementation, the polymer film is selected from the group comprising polyvinylidene difluoride (PVDF), polyethylene oxide (PEO), ethylene oxide (EO), poly-acrylonitrile (PAN), succinonitrile ($C_2H_4(CN)_2$), 2,3-dichloro-5,6-dicyano-1,4-benzoquinone, polyphenylene sulphide, polyether ether ketone (PEEK), carboxymethyl cellulose (CMC), styrene butadiene rubber (SBR) ionic liquids and combinations thereof. In one implementation, the polymer film has a thickness of 20 nanometers or less (e.g., from about 1 nanometer to about 20 nanometers; from about 1 nanometer to about 10 nanometers; or from about 5 nanometers to about 10 nanometers). In some implementations, the polymer film is formed over the exposed surfaces of the dielectric film including the top surface and the sidewalls of the dielectric film. The polymer film can be directly deposited on the protective by Physical Vapor Deposition (PVD), such as evaporation or sputtering, atomic layer deposition (ALD), a slot-die process, dip coating, a thin-film transfer process, gravure coating or a three-dimensional lithium printing process.

FIG. 12 illustrates a schematic view of an integrated processing tool 1200 for forming anode electrode structures according to implementations described herein. The integrated processing tool 1200 may be a SMARTWEB®, manufactured by Applied Materials, adapted for manufacturing lithium anode devices according to the implementations described herein. The integrated processing tool 1200 is constituted as a roll-to-roll system including an unwinding module 1202, a processing module 1204 and a winding module 1206. In certain implementations, the processing module 1204 comprises a plurality of processing modules or chambers 1210, 1220, 1230 and 1240 arranged in sequence, each configured to perform one processing operation to a continuous sheet of material 1250 or web of material. In one implementation, as depicted in FIG. 12, the processing chambers 1210-1240 are radially disposed about a processing drum 1255. Other arrangements besides radial are contemplated. In one implementation, the processing chambers 1210-1240 are stand-alone modular processing chambers wherein each modular processing chamber is structurally separated from the other modular processing chambers. Therefore, each of the stand-alone modular processing chambers, can be arranged, rearranged, replaced, or maintained independently without affecting each other. Although four processing chambers 1210-1240 are shown, it should be understood that any number of processing chambers may be included in the integrated processing tool 1200.

The processing chambers 1210-1240 may include any suitable structure, configuration, arrangement, and/or components that enable the integrated processing tool 1200 to deposit a lithium anode device according to implementations of the present disclosure. For example, but not limited to, the processing chambers may include suitable deposition systems including coating sources, power sources, individual pressure controls, deposition control systems, and temperature control. According to typical implementations, the chambers are provided with individual gas supplies. The chambers are typically separated from each other for providing a good gas separation. The integrated processing tool 1200 according to implementations described herein is not limited in the number of deposition chambers. For example, but not limited to, integrated processing tool 1200 may include 3, 6, or 12 processing chambers.

In some implementations, any of the processing chamber 1210-1240 of the integrated processing tool 1200 may be configured for performing deposition by sputtering, such as magnetron sputtering. As used herein, "magnetron sputtering" refers to sputtering performed using a magnet assembly, that is, a unit capable of a generating a magnetic field. Typically, such a magnet assembly includes a permanent magnet. This permanent magnet is typically arranged within a rotatable target or coupled to a planar target in a manner such that the free electrons are trapped within the generated magnetic field generated below the rotatable target surface. Such a magnet assembly may also be arranged coupled to a planar cathode.

Magnetron sputtering may also be realized by a double magnetron cathode, such as, but not limited to, a Twin-Mag™ cathode assembly. In some implementations, the cathodes in the processing chamber may be interchangeable. Thus, a modular design of the apparatus is provided which facilitates optimizing the apparatus for particular manufacturing requirements. In some implementations, the number of cathodes in a chamber for sputtering deposition is chosen for optimizing an optimal productivity of the integrated processing tool 1200.

In some implementations, one or some of the processing chambers 1210-1240 may be configured for performing sputtering without a magnetron assembly. In particular, one or some of the chambers may be configured for performing deposition by other methods, such as, but not limited to, chemical vapor deposition, atomic laser deposition or pulsed laser deposition.

In certain implementations, the processing chambers 1210-1240 are configured to process both sides of the continuous sheet of material 1250. Although the integrated processing tool 1200 is configured to process a horizontally oriented continuous sheet of material 1250, the integrated processing tool 1200 may be configured to process substrates positioned in different orientations, for example, a vertically oriented continuous sheet of material 1250. In certain implementations, the continuous sheet of material 1250 is a flexible conductive substrate. In certain implementations, the continuous sheet of material 1250 includes a conductive substrate with one or more layers formed thereon. In certain implementations, the conductive substrate is a copper substrate with one or more silicon graphite layers formed thereon.

In certain implementations, the integrated processing tool 1200 comprises a transfer mechanism 1252. The transfer mechanism 1252 may comprise any transfer mechanism capable of moving the continuous sheet of material 1250 through the processing region of the processing chambers 1210-1240. The transfer mechanism 1252 may comprise a common transport architecture. The common transport architecture may comprise a reel-to-reel system with a common take-up-reel 1254 positioned in the winding module 1206, the processing drum 1255 positioned in the processing module 1204, and a feed reel 1256 positioned in the unwinding module 1202. The take-up reel 1254, the processing drum 1255, and the feed reel 1256 may be individually heated. The take-up reel 1254, the processing drum 1255 and the feed reel 1256 may be individually heated using an internal heat source positioned within each reel or an external heat source. The common transport architecture may further comprise one or more auxiliary transfer reels 1253a, 1253b positioned between the take-up reel 1254, the processing drum 1255, and the feed reel 1256. Although the integrated processing tool 1200 is depicted as having a single processing region, in certain implementations, it may be advantageous to have separated or discrete processing regions for each individual processing chamber 1210-1240. For implementations having discrete processing regions, modules, or chambers, the common transport architecture may be a reel-to-reel system where each chamber or processing region has an individual take-up-reel and feed reel and one or more optional intermediate transfer reels positioned between the take-up reel and the feed reel. The common transport architecture may comprise a track system. The track system extends through the processing regions or discrete processing regions. The track system is configured to transport either a web substrate or discrete substrates.

The integrated processing tool 1200 may comprise the feed reel 1256 and the take-up reel 1254 for moving the continuous sheet of material 1250 through the different processing chambers 1210-1240. In one implementation, the first processing chamber 1210 and the second processing chamber 1220 are each configured to deposit a portion of a lithium metal film. The third processing chamber 1230 is configured to deposit a copper film. The fourth processing chamber 1240 is configured to deposit a protective coating over the copper film and the lithium metal film for protecting the lithium metal film from ambient oxidants. In some implementations, the finished negative electrode will not be collected on the take-up reel 1254 as shown in the figures, but may go directly for integration with the separator and positive electrodes, etc., to form battery cells.

In one implementation, processing chambers 1210-1230 are configured for depositing a thin film of lithium metal on the continuous sheet of material 1250. Any suitable lithium deposition process for depositing thin films of lithium metal may be used to deposit the thin film of lithium metal. Deposition of the thin film of lithium metal may be by PVD processes, such as evaporation, a slot-die process, a transfer process, a lamination process or a three-dimensional lithium printing process. The chambers for depositing the thin film of lithium metal may include a PVD system, such as an electron-beam evaporator, a thin film transfer system (including large area pattern printing systems such as gravure printing systems), a lamination system, or a slot-die deposition system.

In one implementation, the fourth processing chamber 1240 is configured for forming a protective film on the lithium metal film. The fourth processing chamber 1240 is configured for forming a protective film on the lithium metal film. The protective film may be an ion conducting material as described herein. The protective film can be formed by dip-coating, slot-die coating, gravure coating, laminating, or printing. In one implementation, the fourth processing chamber 1240 is an evaporation chamber or PVD chamber configured to deposit a ceramic or dielectric layer over the continuous sheet of material 1250. In one implementation, the evaporation chamber has a processing region that is shown to comprise an evaporation source that may be placed in a crucible, which may be a thermal evaporator or an electron beam evaporator (cold) in a vacuum environment, for example.

In summary, some of the benefits of the present disclosure include the efficient integration of lithium metal deposition into currently available processing systems. Currently, lithium metal deposition is performed in a dry room or an argon gas atmosphere. Due to the volatility of lithium metal, subsequent processing operations are performed in an argon gas atmosphere. Performance of subsequent processing operations in an argon gas atmosphere would involve retrofitting of current manufacturing tools. It has been found by the inventors that coating the lithium metal with a protective film prior to subsequent processing, allows subsequent processing to be performed either under vacuum or in atmosphere. The protective film eliminates the need to perform additional processing operations in an inert gas atmosphere reducing the complexity of tools. The protective film also allows for the transportation, storage, or both of the negative electrode with the lithium metal film formed thereon. In addition, in implementations where the protective film is an ion-conducting film, the ion-conducting film can be incorporated into the final battery structure reducing the complexity of the battery formation process. This reduces the complexity of the tool and subsequently reduces the cost of ownership.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A method, comprising:
   forming a lithium metal film on a current collector, wherein the current collector comprises a first copper film;
   forming a metal film on the lithium metal film, wherein the metal film is selected from a second copper film, a bismuth film, a tin film, or any combination thereof, wherein the metal film coats a top surface and sidewalls of the lithium metal film and extends to directly contact the current collector;
   forming a protective film on the metal film, wherein the protective film is a lithium-ion conducting film comprising lithium-ion conducting ceramic, lithium-ion conducting glass, or ion conducting liquid crystal; and
   forming a ceramic film on the protective film, wherein the ceramic film comprises aluminum oxide aluminum oxynitride, aluminum oxyhydroxide, or aluminum nitride.

2. The method of claim 1, wherein the metal film is the second copper film and the second copper film has a thickness within a range from about 5 nanometers to about 40 nanometers.

3. The method of claim 2, wherein the second copper film has a thickness within a range from about 10 nanometers to about 20 nanometers.

4. The method of claim 1, wherein the current collector has a thickness within a range from about 2 micrometers to about 8 micrometers.

5. The method of claim 1, wherein the current collector comprises:
   a first nickel or a first chromium containing film;
   the first copper film formed on the first nickel or the first chromium containing film and having a thickness within a range from about 50 nanometers to about 500 nanometers; and
   a second nickel or a second chromium containing film formed on the first copper film and having a thickness within a range from about 20 nanometers to about 50 nanometers.

6. The method of claim 1, wherein the current collector comprises:
   a polyethylene terephthalate (PET) polymer substrate; and
   the first copper film formed on the PET polymer substrate, wherein the first copper film is deposited via a physical vapor deposition process.

7. The method of claim 1, wherein the protective film coats a top surface and sidewalls of the metal film.

8. The method of claim 1, wherein the ceramic coating is a binder-free film.

9. A method, comprising:
   forming a lithium metal film on an anode film formed on a current collector, wherein the current collector comprises a first copper film and the anode film is selected from graphite and silicon-containing graphite;
   forming a metal film on the lithium metal film, wherein the metal film is selected from a second copper film, a bismuth film, a tin film, or any combination thereof, wherein the metal film coats a top surface and sidewalls of the lithium metal film and extends to directly contact the current collector;
   forming a protective film formed on the metal film, wherein the protective film is a lithium-ion conducting film comprising lithium-ion conducting ceramic, lithium-ion conducting glass, or ion conducting liquid crystal; and forming a ceramic coating on the protective film, wherein the ceramic coating comprises aluminum oxide aluminum oxynitride, aluminum oxyhydroxide, or aluminum nitride.

10. The method of claim 9, wherein the metal film is the second copper film and the second copper film has a thickness within a range from about 10 nanometers to about 20 nanometers.

11. The method of claim 9, wherein the current collector has a thickness within a range from about 2 micrometers to about 8 micrometers.

12. The method of claim 9, wherein the current collector comprises:
a first nickel or a first chromium containing film;
the first copper film formed on the first nickel or the first chromium containing film and having a thickness within a range from about 50 nanometers to about 500 nanometers; and
a second nickel or a second chromium containing film formed on the first copper film and having a thickness within a range from about 20 nanometers to about 50 nanometers.

13. The method of claim 9, wherein the current collector comprises:
a polyethylene terephthalate (PET) polymer substrate; and
the first copper film formed on the PET polymer substrate, wherein the first copper film is deposited via a physical vapor deposition process.

14. The method of claim 9, wherein the protective film coats a top surface and sidewalls of the metal film.

15. The method of claim 9, wherein the ceramic coating is a binder-free film.

16. A method, comprising:
forming an anode film on a current collector, wherein the current collector comprises a first copper film;
forming a lithium metal film on the anode film, wherein the anode film comprises graphite or silicon-containing graphite; and
forming a protective film stack on the lithium metal film, wherein the protective film stack coats a top surface and sidewalls of the lithium metal film and extends to directly contact the current collector, wherein the protective film stack comprises:
a protective film disposed on the lithium metal film, wherein the protective film coats a top surface and sidewalls of the lithium metal film and extends to directly contact the current collector;
a first polymer film disposed on the protective film, wherein the first polymer film coats a top surface and sidewalls of the protective film,
a ceramic film disposed on the first polymer film, wherein the ceramic film coats a top surface and sidewalls of the first polymer film; and
a second polymer film disposed on the ceramic film, wherein the second polymer film coats a top surface and sidewalls of the ceramic film.

17. The method of claim 16, wherein the protective film comprises lithium fluoride, aluminum oxide, aluminum oxyhydroxide, a copper chalcogenide, bismuth chalcogenide, lithium carbonate, or any combination thereof.

18. The method of claim 16, wherein each of the first polymer film and the second polymer film independently comprises polyvinylidene difluoride, polyethylene oxide, ethylene oxide, poly-acrylonitrile, succinonitrile, 2,3-dichloro-5,6-dicyano-1,4-benzoquinone, polyphenylene sulphide, polyether ether ketone, carboxymethyl cellulose, styrene butadiene rubber, or any combination thereof.

19. The method of claim 16, wherein the ceramic film comprises aluminum oxide, aluminum oxynitride, aluminum oxyhydroxide, and aluminum nitride.

* * * * *